(12) United States Patent
Chae et al.

(10) Patent No.: US 10,123,064 B2
(45) Date of Patent: Nov. 6, 2018

(54) CONTENT PROVIDING METHOD AND DEVICE

(71) Applicant: SAMSUNG ELECTRONICS CO., LTD., Suwon-si (KR)

(72) Inventors: Han-joo Chae, Seoul (KR); Nam-wook Kang, Seoul (KR); Jin La, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 14/272,604

(22) Filed: May 8, 2014

(65) Prior Publication Data

US 2014/0337412 A1 Nov. 13, 2014

(30) Foreign Application Priority Data

May 8, 2013 (KR) .................. 10-2013-0052006
Jul. 18, 2013 (KR) .................. 10-2013-0084935

(51) Int. Cl.
*G06F 15/16* (2006.01)
*H04N 21/25* (2011.01)
(Continued)

(52) U.S. Cl.
CPC ......... *H04N 21/251* (2013.01); *H04N 21/252* (2013.01); *H04N 21/25875* (2013.01); *H04N 21/2747* (2013.01); *H04N 21/41407* (2013.01); *H04N 21/4402* (2013.01); *H04N 21/4415* (2013.01); *H04N 21/44204* (2013.01); *H04N 21/44222* (2013.01); *H04N 21/462* (2013.01);
(Continued)

(58) Field of Classification Search
CPC ............ H04N 21/251; H04N 21/6334; H04N 21/6547; H04N 21/6582; H04N 21/4415; H04N 21/44222; H04N 21/4826
See application file for complete search history.

(56) References Cited

U.S. PATENT DOCUMENTS 8,718,439 B2 5/2014 Rosengart et al.
9,338,386 B2 5/2016 Jung et al.
(Continued)

FOREIGN PATENT DOCUMENTS

CN 101630987 A 1/2010
CN 102017649 A 4/2011
(Continued)

OTHER PUBLICATIONS

Communication dated Aug. 21, 2014 issued by the International Searching Authority in counterpart International Patent Application No. PCT/KR2014/004050.
(Continued)

*Primary Examiner* — Michael A Keller
(74) *Attorney, Agent, or Firm* — Sughrue Mion, PLLC

(57) ABSTRACT

A content reproduction device includes: a communicator that requests a server for recommended content information, and receives from the server the recommended content information as a response to the request; a controller that is configured to select content based on the received recommended content information; and a display that outputs the selected content, wherein the recommended content information is information for selecting the content according to a viewing information.

48 Claims, 17 Drawing Sheets

(51) Int. Cl.

| | | |
|---|---|---|
| *H04N 21/4415* | (2011.01) | |
| *H04N 21/442* | (2011.01) | |
| *H04N 21/482* | (2011.01) | |
| *H04N 21/6334* | (2011.01) | |
| *H04N 21/6547* | (2011.01) | |
| *H04N 21/658* | (2011.01) | |
| *H04N 21/258* | (2011.01) | |
| *H04N 21/2747* | (2011.01) | |
| *H04N 21/414* | (2011.01) | |
| *H04N 21/4402* | (2011.01) | |
| *H04N 21/462* | (2011.01) | |

(52) U.S. Cl.
CPC ..... *H04N 21/4826* (2013.01); *H04N 21/6334* (2013.01); *H04N 21/6547* (2013.01); *H04N 21/6582* (2013.01)

(56) References Cited

U.S. PATENT DOCUMENTS

| | | |
|---|---|---|
| 9,460,092 B2 | 10/2016 | Murphy et al. |
| 2003/0237093 A1 | 12/2003 | Marsh |
| 2007/0157221 A1 | 7/2007 | Ou et al. |
| 2007/0239787 A1* | 10/2007 | Cunningham ...... G06F 3/04817 |
| 2009/0271820 A1 | 10/2009 | Choi et al. |
| 2010/0192069 A1* | 7/2010 | Toebes .............. G06F 17/30867 |
| | | 715/745 |
| 2012/0023444 A1 | 1/2012 | Patil et al. |
| 2012/0210364 A1 | 8/2012 | Lee et al. |
| 2013/0007801 A1* | 1/2013 | Lehtonen ........... G06Q 30/0207 |
| | | 725/34 |
| 2013/0103171 A1* | 4/2013 | Dangerfield ............ G06F 1/163 |
| | | 700/94 |
| 2013/0145387 A1 | 6/2013 | Van Brandenburg et al. |
| 2014/0215506 A1* | 7/2014 | Kalmes ............ H04N 21/25841 |
| | | 725/14 |
| 2014/0250043 A1* | 9/2014 | Malinsky ................. G06N 5/02 |
| | | 706/46 |
| 2015/0169189 A1* | 6/2015 | Want ...................... G06Q 30/02 |
| | | 715/740 |
| 2015/0264439 A1* | 9/2015 | Karlin .............. H04N 21/42202 |
| | | 725/12 |

FOREIGN PATENT DOCUMENTS

| | | |
|---|---|---|
| EP | 2276253 A2 | 1/2011 |
| EP | 2577982 A1 | 4/2013 |
| KR | 10-2010-0045196 A | 5/2010 |
| KR | 10-2010-0051961 A | 5/2010 |
| KR | 10-2010-0053135 A | 5/2010 |
| KR | 10-2010-0069395 A | 6/2010 |
| KR | 10-2011-0076310 A | 7/2011 |
| KR | 10-1145877 B1 | 5/2012 |
| RU | 2011114092 A | 10/2012 |
| RU | 2600541 C2 | 10/2016 |
| WO | 2010148052 A2 | 12/2010 |
| WO | 2011155827 A1 | 12/2011 |

OTHER PUBLICATIONS

Communication dated Aug. 18, 2016, issued by the European Patent Office in counterpart European Application No. 14794611.5.
Kang Yong Lee et al: "Social TV service: A Case Study", IEEE International Conference on Consumer Electronics (ICCE), Jan. 9, 2011, pp. 287-288, XP031921234, (2 pages total).
Xiaoyan Wang et al: "Group Recommendation Using External Followee for Social TV", IEEE International Conference on Multimedia and Expo, Jul. 9, 2012, pp. 37-42, XP032235649, (6 pages total).
Jozef Ban et al: "Face Recognition Methods for Multimodal Interface", Wireless and Mobile Networking Conference (WMNC), 5th Joint IFIP, IEEE, Sep. 19, 2012, pp. 110-113, XP032314525, (4 pages total).
Communication dated Aug. 31, 2017, issued by the Russian Patent Office in counterpart Russian Application No. 2015152203.
Communication dated Oct. 3, 2017, issued by the Australian Patent Office in counterpart Australian Application No. 2014263336.
Communication dated Jun. 9, 2017 by the Australian Patent Office in counterpart Australian Patent Application No. 2014263336.
Communication dated Jan. 17, 2018, from the Russian Patent Office in counterpart Russian Application No. 2015152203/07.
Communication dated Apr. 3, 2018, from the State Intellectual Property Office of People's Republic of China in counterpart Application No. 201480026219.7.

* cited by examiner

| USER INFORMATION (972) | | | | | CONTENT INFORMATION (974) | |
|---|---|---|---|---|---|---|
| USER ID (913) | AGE (914) | REGION (915) | SEX (916) | PREFERENCE (917) | CHANNEL INFORMATION (976) | CONTENT ID (978) |
| G99 | 30 | SEOUL | MALE | SPORTS | 41 | X88 |

SET CONTENT RECOMMENDATION MODE

REPRODUCE CONTENT
(OUTPUT BROADCAST CHANNEL)
ACCORDING TO RECOMMENDED
CONTENT) INFORMATION

CHANGE REPRODUCED CONTENT
(BROADCAST CHANNEL)

STOP CHANGING REPRODUCED CONTENT
(BROADCAST CHANNEL) WHEN CONTENT
RECOMMENDATION MODE IS TERMINATED

OUTPUT USER INTERFACE FOR
PURCHASING REPRODUCTION
AUTHORIZATION

REPRODUCE CONTENT BASED ON
PURCHASED REPRODUCTION AUTHORIZATION

CONTENT PROVIDING METHOD AND DEVICE

CROSS-REFERENCE TO RELATED APPLICATIONS

This application claims priority from Korean Patent Application No. 10-2013-0052006, filed on May 8, 2013, and Korean Patent Application No. 10-2013-0084935, filed on Jul. 18, 2013, in the Korean Intellectual Property Office, the disclosures of which are incorporated herein in their entireties by reference.

BACKGROUND

1. Field

Methods and apparatuses consistent with exemplary embodiments relate to providing appropriate content to a user.

2. Description of the Related Art

Since content reproducing devices, such as a television (TV), a home appliance including a monitor, and a cellular phone, have become widely popular, the users are able to view numerous content through various devices.

Owing to an increase in content that users are able to view, users need a method of easily selecting content that users want to view among numerous content.

To meet diverse demands of diverse users, service providers need to collect information regarding users.

Content providers need a method of appropriately providing content to users who want to view content provided by content providers.

SUMMARY

Exemplary embodiments may address at least the above problems and/or disadvantages and other disadvantages not described above. The exemplary embodiments are not required to overcome the disadvantages described above, and may not overcome any of the problems described above.

One or more exemplary embodiments include a method and a system for easily selecting content desired by a user.

One or more exemplary embodiments include a method and a system for obtaining information about a user by allowing a server for providing a content recommendation service to collect information regarding content viewed by the user.

One or more exemplary embodiments include a method and a system for more appropriately providing content to a user by allowing a content provider to provide information regarding content to a server for providing a content recommendation service.

According to an aspect of an exemplary embodiment, a content reproduction device for reproducing content includes a communicator that requests a server for recommended content information, and receives from the server the recommended content information as a response to the request; a controller configured to select content based on the received recommended content information; and a display that outputs the selected content, wherein the recommended content information is information for selecting the content according to a viewer rating that is information related to the number of times the content is reproduced in other devices.

When the content reproduction device is turned on, the communicator may request the server for the recommended content information, and the display may output the selected content as a first screen.

When a content reproduction mode of the content reproduction device is a content recommendation mode, the communicator may request the server for the recommended content information, and the display outputs the content.

The controller that is configured to set the content recommendation mode as gesture information, which is preset, may be input.

The controller that is configured to set the content recommendation mode when a number of times content reproduced by the content reproduction device is changed based on a user input may be equal to or greater than a critical value that is preset.

The content may be reproduced by using a broadcast signal received through a broadcast channel, the recommended content information may include information about the broadcast channel, and the controller may be further configured to tune the broadcast channel output through the display based on the information about the broadcast channel.

The recommended content information may include connection information for accessing the selected content, and the communicator may receive the selected content by using the connection information.

The communicator may transmit user information to the server, and the recommended content information received from the server may be generated based on the user information.

The controller may be further configured to select the content based on the recommended content information and user information.

The user information may include at least one of user identification information, user gender information, user age information, and user-preferred content information.

The user information may be obtained through image recognition for an image that is obtained by a camera provided in the content reproduction device.

The controller may be further configured to detect a holder of a remote controller for controlling the content reproduction device, and to determine the user information according to a result of the detection.

The controller may be further configured to select a plurality of pieces of content based on the recommended content information, and the display sequentially may output the selected plurality of pieces of content.

The recommended content information may be generated by the server based on viewing information transmitted to the server from a plurality of content reproduction devices.

The recommended content information may be generated based on viewer rating information according to the viewing information.

The controller may be further configured to reproduce the selected content by using a virtual channel.

According to an aspect of an exemplary embodiment, a server for recommending content may include a controller that is configured to receive viewing information about content that is being reproduced in a plurality of content reproduction devices from the plurality of content reproduction devices, and generate recommended content information based on the received viewing information; and a communicator that receives a request for the recommended content information from a content reproduction device, and transmits the recommended content information to the content reproduction device as a response to the request, wherein the recommended content information is information for selecting the content according to a viewer rating that is information related to the number of times the content is reproduced in other devices.

The recommended content information may include information for selecting a broadcast channel.

The recommended content information may include connection information for accessing the content.

The communicator may receive user information from the content reproduction device, and the controller may be further configured to generate the recommended content information corresponding to the user information and a time at which the request is received.

The user information may include at least one of user identification information, user gender information, user age information, and user-preferred content information.

The controller may generate viewer rating information about the content based on the viewing information received from the plurality of content reproduction devices, and generate the recommended content information based on the viewer rating information.

The controller may be further configured to generate the recommended content information in preset cycles, and the communicator may transmit the recommended content information that is most recently generated from a time when the request is received, to the content reproduction device.

According to an aspect of an exemplary embodiment, a method performed by a content reproduction device to reproduce content includes requesting a server for recommended content information; receiving the recommended content information as a response to the request from the server; selecting content based on the received recommended content information; and outputting the selected content, wherein the recommended content information is information for selecting the content according to a viewer rating that is information related to the number of times the content is reproduced in other devices.

The requesting of the server for the recommended content information may include, when the content reproduction device is turned on, requesting the server for the recommended content information.

The requesting of the server for the recommended content information may, when a content reproduction mode of the content reproduction device is a content recommendation mode, requesting the server for the recommended content information.

The method may further include setting the content recommendation mode as gesture information that is preset is input.

The method may further include, when the number of times content reproduced by the content reproduction device is changed based on a user input is equal to or greater than a critical value that is preset, setting the content recommendation mode.

The content may include content that is reproduced by using a broadcast signal received through a broadcast channel, the recommended content information may include information about the broadcast channel, and the outputting of the content may include tuning the broadcast channel based on the information about the broadcast channel.

The recommended content information may include connection information for accessing the selected content, and the outputting of the content may include receiving the selected content by using the connection information, and outputting the received content.

The requesting of the server for the recommended content information may include transmitting user information to the server, and the recommended content information received from the server may be generated based on the user information.

The selecting of the content may include selecting the content based on the recommended content information and user information.

The user information may include at least one of user identification information, user gender information, user age information, and user-preferred content information.

The user information may be obtained through image recognition for an image that is obtained by a camera provided in the content reproduction device.

The selecting of the content may include selecting a plurality of pieces of content based on the recommended content information, and the outputting of the content may include sequentially outputting the selected plurality of pieces of content.

The recommended content information may be generated by the server based on viewing information transmitted to the server from a plurality of content reproduction devices.

The recommended content information may be generated based on viewer rating information according to the viewing information.

The outputting of the content may include outputting the selected content by using a virtual channel.

According to an aspect of an exemplary embodiment, a method performed by a server of recommending content may include receiving viewing information about content that is being reproduced in a plurality of content reproduction devices from the plurality of content reproduction devices; generating recommended content information based on the received viewing information; receiving a request for the recommended content information from a content reproduction device; and transmitting the recommended content information to the content reproduction device as a response to the request, wherein the recommended content information includes information for selecting the content according to a viewer rating information related to a number of times the content is reproduced in other devices.

The recommended content information may include information for selecting a broadcast channel.

The recommended content information may include connection information for accessing the selected content.

The receiving of the request for the recommended content information may include receiving user information from the content reproduction device, and the transmitting of the recommended content information may include transmitting to the content reproduction device the recommended content information corresponding to the user information and a time when the request is received.

The user information may include at least one of user identification information, user gender information, user age information, and user-preferred content information.

The generating of the recommended content information may include: generating the viewer rating information about the content based on the viewing information received from the plurality of content reproduction devices; and generating the recommended content information based on the viewer rating information.

The generating of the recommended content information may include generating the recommended content information in preset cycles, and the transmitting of the recommended content information may include transmitting to the content reproduction device the recommended content information that is mostly recently generated from a time at which the request is received.

According to an aspect of an exemplary embodiment, there is provided a non-transitory computer-readable storage medium storing a computer program for executing the method.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
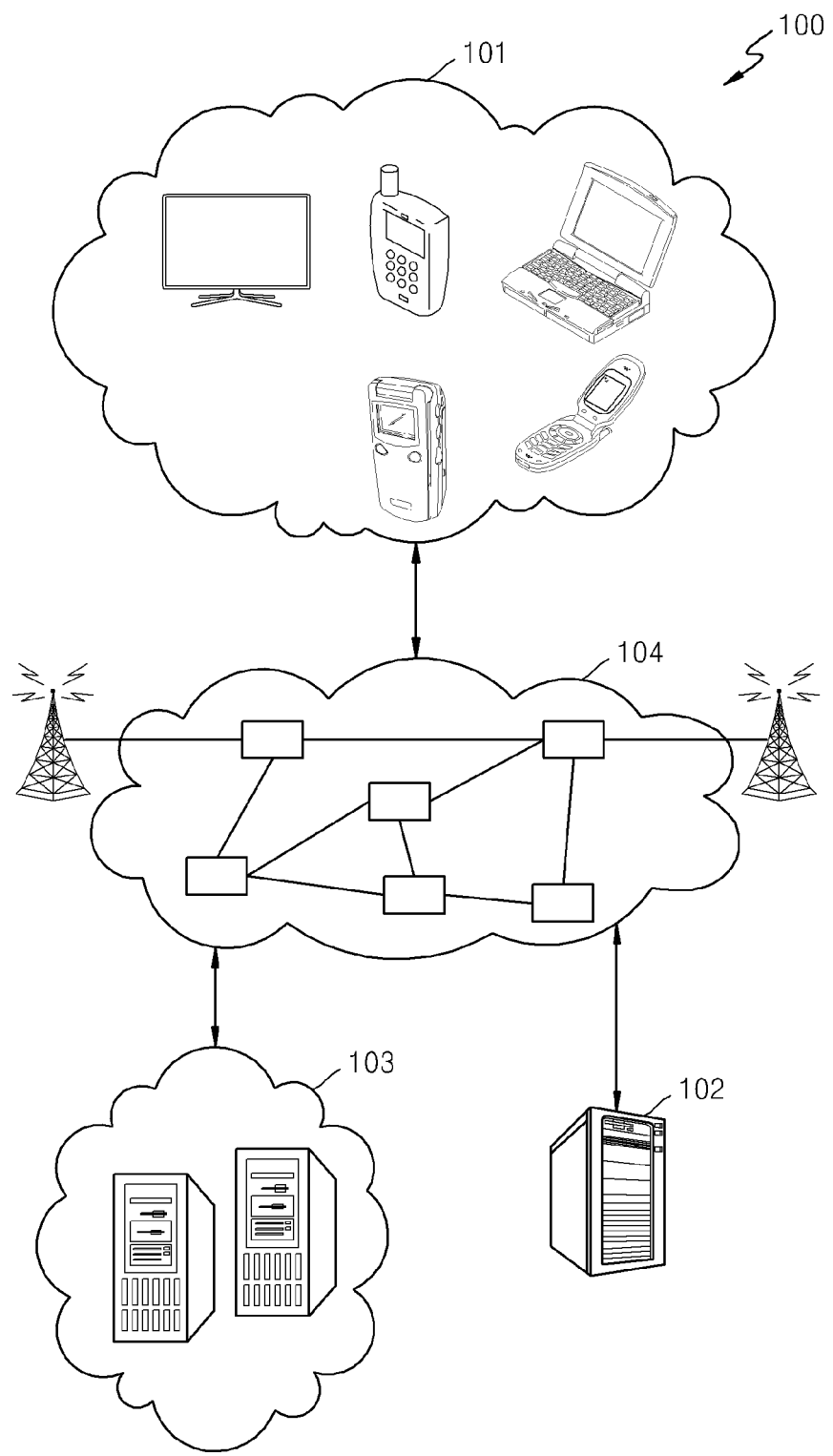
FIG. 1 is a diagram of a content providing system, according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Throughout the specification, when an element is referred to as being "connected" or "coupled" to another element, it may be "directly connected or coupled" to the other element or "electrically connected or coupled" with intervening elements. When an element is "connected" or "coupled" to another element, it means that the element may communicate with the other element through signal transmission and reception.

When a part "includes" or "comprises" an element, unless there is a particular description contrary thereto, the part may further include other elements.

Throughout the specification, a term 'module' should be construed to include software, hardware, or combinations of these according to context including the term. For example, software may include a mechanical language, firmware, embedded code, and application software. As another example, hardware may include a circuitry, a processor, a computer, an integrated circuit, an integrated circuit core, a sensor, a micro-electro-mechanical system (MEMS), a manual device, or combinations of theses.

Most of the terms used herein are general terms that are widely used in the technical art to which the present teaching pertains. However, some of the terms used herein may be created to reflect intentions of those skilled in this art, precedents, or new technologies. Also, some of the terms used herein may be arbitrarily chosen by the applicant. In this case, these terms are defined in detail below. Accordingly, the specific terms used herein should be understood based on the unique meanings thereof and the whole context of the present teaching.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof.

Expressions such as "at least one of," when preceding a list of elements, modify the entire list of elements and do not modify the individual elements of the list.

FIG. 1 is a diagram of a content providing system 100, according to an exemplary embodiment. The content providing system 100 may operate as a client or a server, and may include one or more content reproduction devices 101 for reproducing content and a server 102 for recommending content. The content reproduction device 101 and the server 102 for recommending content may be connected to each other over a communication network 104 configured as a wired or wireless network. The content providing system 100 may further include one or more content providers 103 for providing content to the content reproduction device 101. However, the server 102 for recommending content, according to an exemplary embodiment, may perform a function of the content provider 103. The content provider 103 is not necessarily physically independent from the server 102 for recommending content.

For example, the content reproduction device 101 may include various types of devices. The content reproduction device 101 may be a fixed device such as a TV for reproducing an image or a home appliance having a display such as a monitor. The content reproduction device 101 may be a cellular phone for reproducing an image, a personal digital assistant (PDA), a notebook computer, or a mobile communication or entertainment device having various other functions. The content reproduction device 101 may be a stand-alone device or a device coupled to another device. For example, the content reproduction device 101 may include a device coupled to a plurality of TVs connected to a same access point or a plurality of devices such as a tablet PC and a smartphone connected via short distance wireless communication. The content reproduction device 101 may be connected to the communication network 104 to communicate with another device.

The server 102 for recommending content may include various computing devices. For example, the server 102 for recommending content may include a computer, a grid computing resource, a virtual computer resource, a cloud computing resource, a router, a switch, a peer-to-peer (P2P) distributed computing device, or combinations of these.

The server 102 for recommending content may be centralized in a single space, may be distributed in another space, or may be embedded within a long distance network. The server 102 for recommending content may be connected to a communication network 104 to communicate with another device. The server 102 for recommending content may be a client device or a server device.

As another example, the server 102 for recommending content may be include a specialized device such as a mainframe, a server, a cluster server, a rack mounted server, or a blade server.

The content provider 103 may include a device for providing content that is to be provided to the content reproduction device 101. For example, when the content that is to be provided to the content reproduction device 101 is a TV broadcast image, the content provider 103 may include a device for sending a TV broadcast signal. As another example, when the content that is to be provided to the content reproduction device 101 is a video on demand (VOD), the content provider 103 may include a server for providing a VOD service.

The communication network 104 may be a network of various forms. For example, the communication network 104 may include wireless communication, wired communication, optical communication, ultrasound communication, or combinations of these. Satellite communication, mobile communication, Bluetooth, infrared data association standard (IrDA), wireless fidelity (WiFi), worldwide interoperability for microwave access (WiMAX) may be examples of wireless communication configuring the communication network 104. Ethernet, digital subscriber line (DSL), fiber to the home (FTTH), and plain old telephone service (POTS) may be examples of wired communication configuring the communication network 104.

However, the content providing device 101, the server 102 for recommending content, and the content provider 103 do not necessarily communicate with each other via the communication network 104. Direct communication between devices may be performed via direct P2P between devices.

The communication network 104 may be formed over a large number of network topologies and distances. For example, the communication network 104 may include a direct connection, a personal area network (PAN), a local area network (LAN), a metropolitan area network (MAN), a wide area network (WAN), and combinations of these.

The content providing device 101 may reproduce content stored therein or content provided from the content provider 103.

Figure 2:
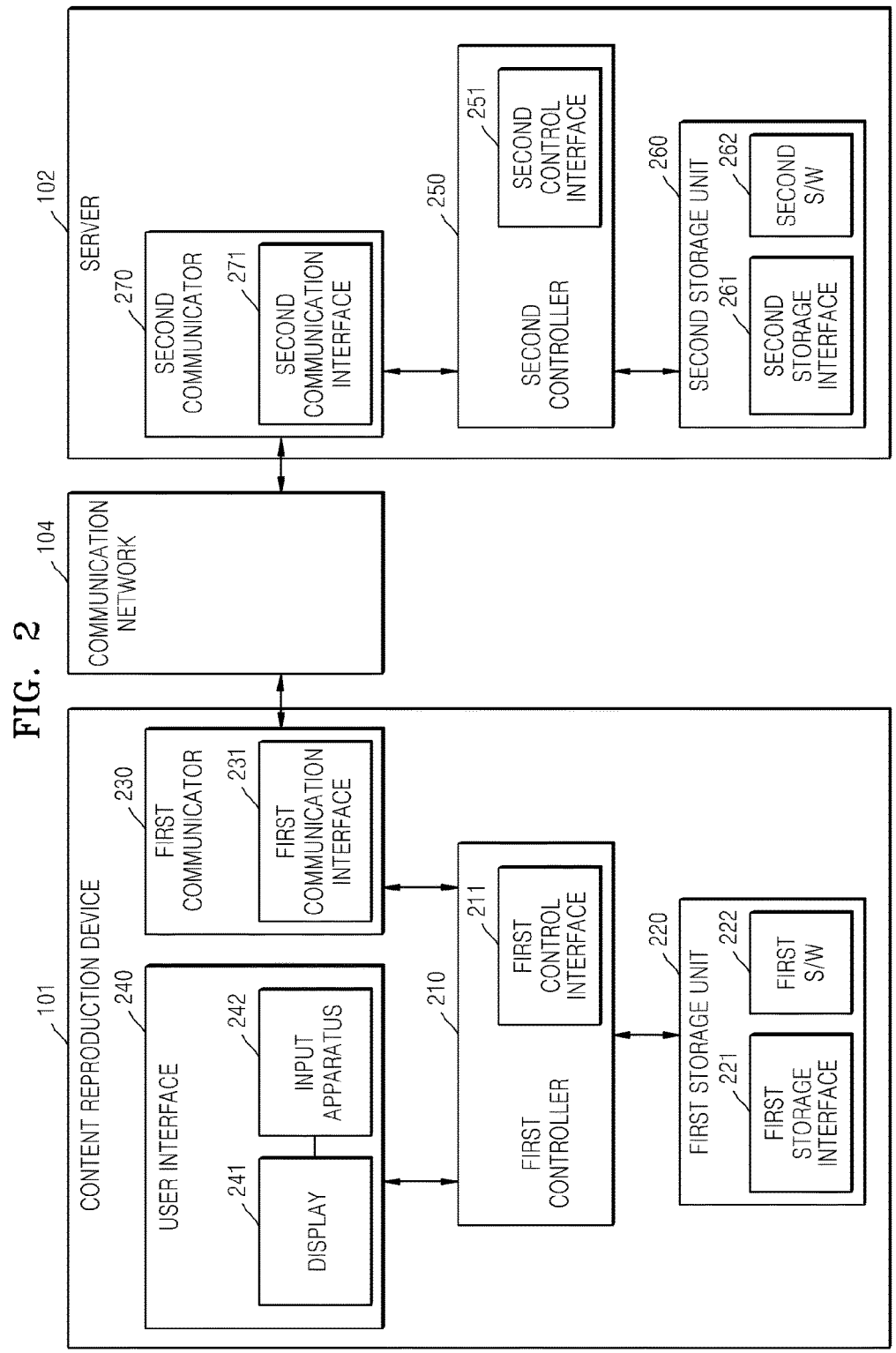
FIG. 2 is a block diagram of a content reproduction device and a content recommendation server, according to an exemplary embodiment.

FIG. 2 is a block diagram of structures of the content reproduction device 101 and the server 102 for recommending content, according to an exemplary embodiment. The content providing system 100 according to an exemplary embodiment may include the content reproduction device 101, the server 102 for recommending content, and the communication network 104. The content reproduction device 101 and the server 102 for recommending content may communicate with each other over the communication network 104.

The content reproduction device 101 may include a first controller 210, a first storage unit 220, e.g., a first memory, a first communicator 230, and a user interface 240. The first controller 210 may execute first software (S/W) 222. The first controller 210 may be implemented in various ways. For example, the first controller 210 may include a processor, an embedded processor, a microprocessor, a hardware control logic circuit, a hardware finite state machine (FSM), a digital signal processor (DSP), or combinations of these. A first control interface 211 may be used to allow the first controller 210 and another element of the content reproduction device 101 to communicate with each other. The first control interface 211 may be used to perform communication with an external unit of the content reproduction device 101.

The first control interface 211 may receive information from another element or another external resource. Alternatively, the first control interface 211 may transmit information to another element or another external resource. The external resource may be a resource physically separated from the content reproduction device 101.

The first control interface 211 may be implemented in various ways. The first control interface 211 may be differently implemented according to another element connected to the first control interface 211 or external resources. For example, the first control interface 211 may include a MEMS, an optical circuit, a waveguide, a wireless circuit, a wired circuit, or combinations of these.

The first storage unit 220 may store the first software 222 and/or information such as user information.

The first storage unit 220 may be a volatile memory, a non-volatile memory, an embedded memory, an external memory, or combinations of these. For example, the first storage unit 220 may include a non-volatile RAM (NVRAM), a flash memory, a non-volatile memory such as a disc storage apparatus, or a volatile memory such as a static RAM (SRAM).

Although the first storage unit 220 is illustrated as a single element, the first storage unit 220 may include a distributed storage apparatus.

The first storage unit 220 may include a first storage interface 221 which may be used to allow the first storage unit 220 and another element of the content providing device 101 to communicate with each other. The first storage interface 221 may be used to allow the first storage unit 220 and an external device of the content providing device 101 to communicate with each other.

The first storage interface 221 may receive information from another element or another external resource. Alternatively, the first storage interface 221 may transmit information to another element or another external resource. The external resource may be a resource physically separated from the content reproduction device 101.

The first storage interface 221 may be differently implemented according to another element connected to the first storage unit 220 or external resources. The first storage interface 221 may be implemented by using a technology similar to the first control interface 211.

The first communicator 230 may allow the content reproduction device 101 to perform external communication. For example, the first communicator 230 may allow the content reproduction device 101 to communicate with the server 102 for recommending content, the content provider 103, a peripheral device or an additional device, and the communication network 104.

The first communicator 230 may function as a communication hub to allow the content reproduction device 101 to function as a part of the communication network 104, and is not limited to a terminal of the communication network 104. The first communicator 230 may include an active component and/or a passive component such as a microcomputer or an antenna for interaction with the communication network 104.

The first communicator 230 may include a first communication interface 231 which may be used to allow the first communicator 230 and another element of the content reproduction device 101 to communicate with each other. The first communication interface 231 may receive and transmit information from and to another element. I.e., the first communication interface 231 may be a transceiver.

The user interface 240 may output content and allow a user of the content reproduction device 101 to interact with the content reproduction device 101. The user interface 240 may include a display 241 for outputting the content and an input apparatus 242, i.e. a user input receiver, for transferring data and a communication input. For example, the display 241 may include a liquid crystal display (LCD), a cathode ray tube (CRT), a plasma display panel (PDP), a projector, a video screen, or combinations of these. For example, the input apparatus 242 may include a keypad, a touch pad, a soft key, a press switch, a keyboard, a camera, a microphone, or combinations of these.

The display 241 and the input apparatus 242 may not necessarily be separated from each other physically, and may be implemented as a single apparatus such as a touch screen.

The display 241 may include various output apparatuses for outputting content such as a speaker and an output apparatus for outputting an image.

The first controller 210 may operate the display 241 to display content. The first controller 210 may execute the first software 222 to perform a function of the content providing system 100. The first controller 210 may execute the first software 222 to communicate with the communication network 104 through the first communicator 230.

The first controller 210 may transmit viewing information 911 regarding content that is being reproduced by the content reproduction device 101 to the server 102 for recommending content through the first communicator 230.

Figures 6, 7:
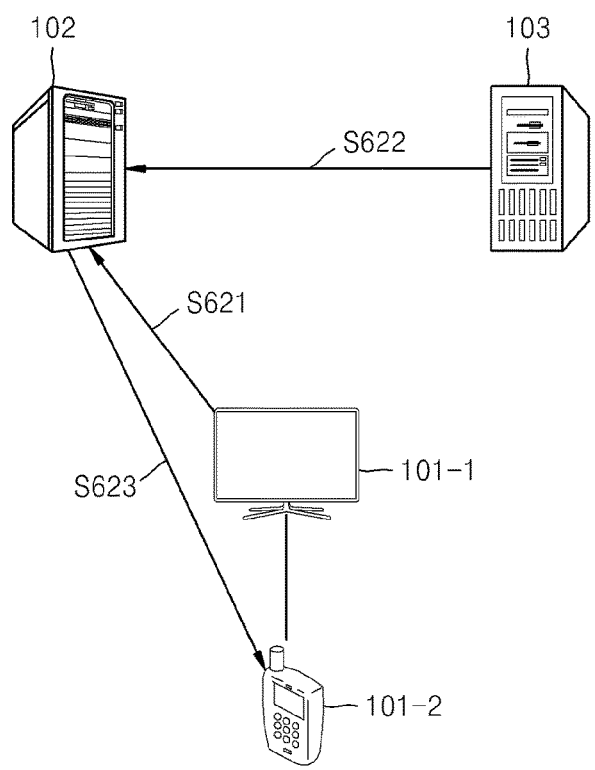
FIG. 6 is a diagram of an operation of a content providing system, according to another exemplary embodiment.
FIG. 7 is a table of viewing information, according to an exemplary embodiment.
Figure 9:
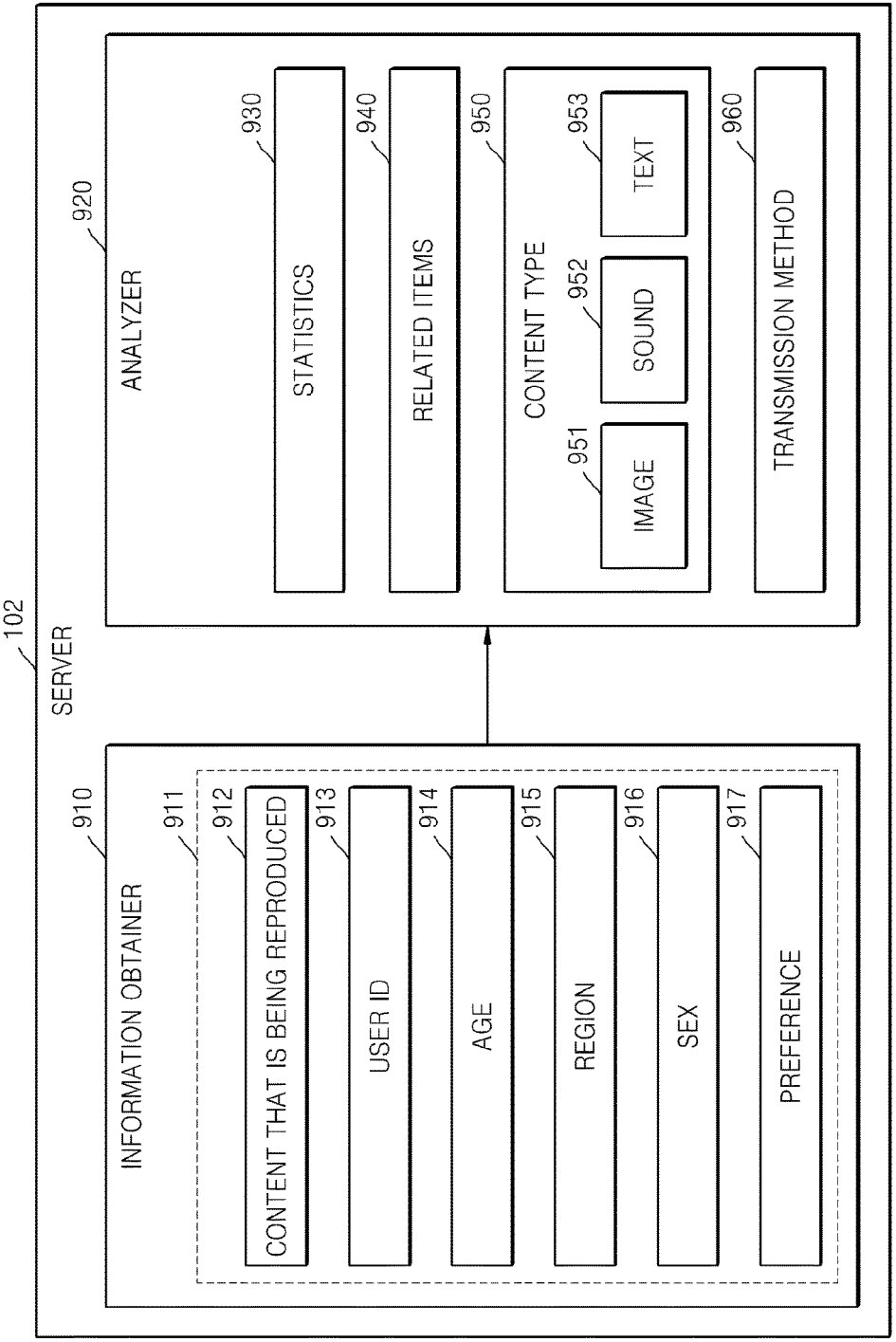
FIG. 9 is a detailed block diagram of a process in which a content recommendation server generates recommended content information, according to an exemplary embodiment.

With reference to FIGS. 7 and 9, the viewing information 911 may include content identification (ID) information, information regarding a user who views content, or a combination of these. The viewing information 911 is described in greater detail below.

The first controller 210 may obtain the viewing information 911 through the user interface 240 or the first storage unit 220.

The server 102 for recommending content may include a second controller 250, a second storage unit 260, e.g., a second memory, and a second communicator 270.

The second controller 250 may execute second software (S/W) 262. The second controller 250 may be implemented in various ways. For example, the second controller 250 may include a processor, an embedded processor, a microprocessor, a hardware control logic circuit, a hardware FSM, a DSP, or combinations of these. A second control interface 251 may be used to allow the second controller 250 and another element of the server 102 for recommending content to communicate with each other. The second control interface 251 may be used to perform communication with an external unit of the server 102 for recommending content.

The second control interface 251 may transmit and receive information to and from another element or another external resource. The external resource may be a resource physically separated from the server 102 for recommending content.

The second control interface 251 may be implemented in various ways. The second control interface 251 may be differently implemented according to another element connected to the second control interface 251 or external resources. For example, the second control interface 251 may include a MEMS, an optical circuit, a waveguide, a wireless circuit, a wired circuit, or combinations of these.

The second storage unit 260 may store the second software 262. The second storage unit 260 may store information regarding content that is to be provided to the content reproduction device 101. For example, the second storage unit 260 may store a content list, viewing statistics, information regarding items related to content, and information regarding content such as a content type and a content transmission method. As another example, the second storage unit 260 may store broadcast channel information for receiving content, electronic program guide (EPG) information related to content, uniform resource locator (URL) information for receiving content, and information regarding content including metadata of the content. In this regard, a URL is merely connection information for accessing content but an exemplary embodiment is not limited thereto. According to an exemplary embodiment, the EPG information may be used to tune a broadcast channel for receiving a broadcast signal output by the content reproduction device 101.

The second storage unit 260 may be a volatile memory, a non-volatile memory, an embedded memory, an external memory, or combinations of these. For example, the second storage unit 260 may be a non-volatile memory such as an NVRAM, a flash memory, a disc storage apparatus, or a volatile memory such as a static RAM (SRAM).

The second storage unit 260 may include a second storage interface 261. The second storage interface 261 may be used to communicate with another element of the server 102 for recommending content. The second storage interface 261 may be used to allow the server 102 for recommending content to communicate with external devices.

The second storage interface 261 may be differently implemented according to another element connected to the second storage unit 260 or external resources. The second storage interface 261 may be implemented by using a technology similar to a second control interface 251.

The second communicator 270 may allow the server 102 for recommending content to communicate with external devices. For example, the second communicator 270 may allow the server 102 for recommending content to communicate with the content reproduction device 101 over the communication network 104.

The second communicator 270 may include a second communication interface 271. The second communication interface 271 may be used to allow the second communicator 270 and another element of the server 102 for recommending content to communicate with each other. I.e., the second communication interface 271 may be a transceiver.

The second communication interface 271 may be differently implemented according to another element connected to the second communicator 270. The second communication interface 271 may be implemented by using a technology similar to the second control interface 251.

The configurations of the content reproduction device 101 and the server 102 for recommending content are not limited to what is illustrated in FIG. 2. For example, the first software 222 may be stored in another storage medium outside the content reproduction device 101. The content reproduction device 101 and the server 102 for recommending content may further include additional elements that are not illustrated in FIG. 2.

The elements included in the content reproduction device 101 and the server 102 for recommending content may independently operate. The content reproduction device 101, the server 102 for recommending content, and the communication network 104 may independently operate.

Figure 3:
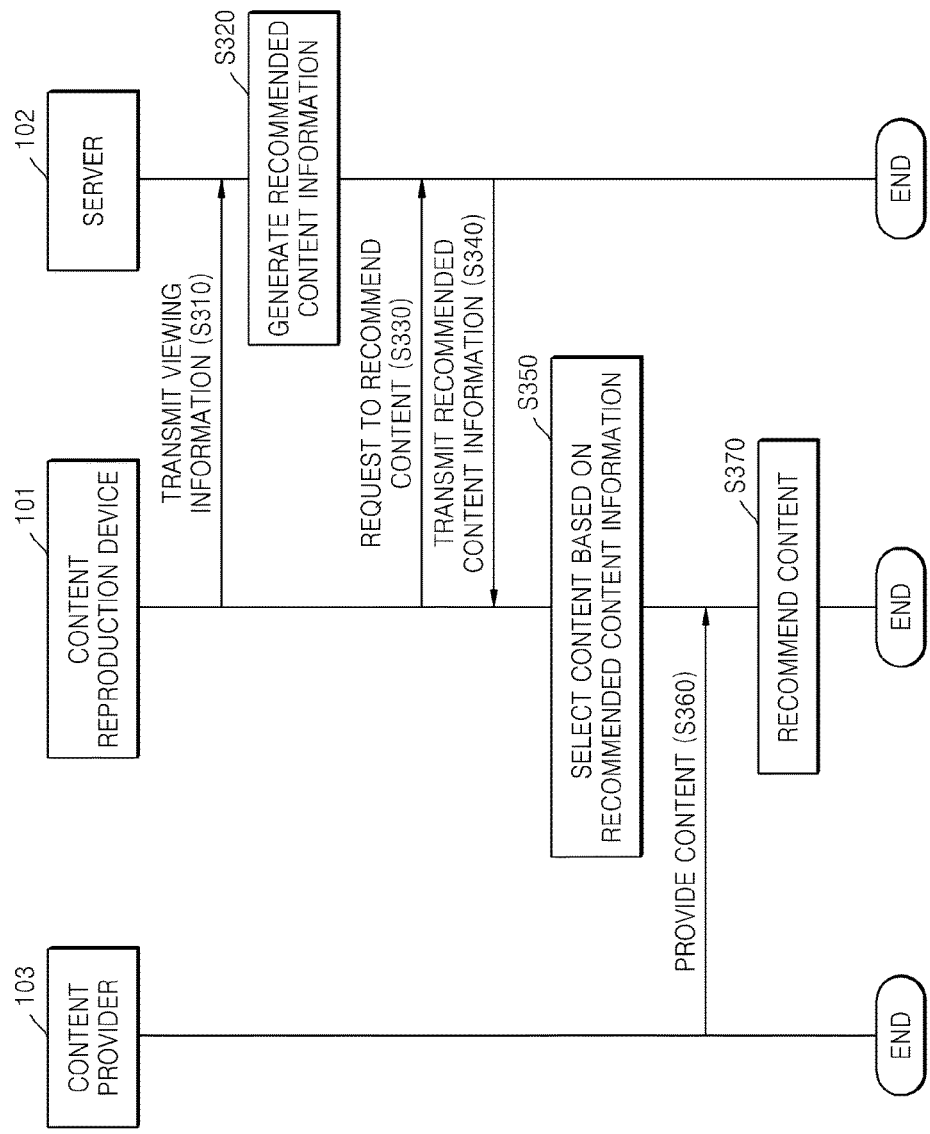
FIG. 3 is a flowchart of a process in which a content providing system provides content, according to an exemplary embodiment.

FIG. 3 is a flowchart of a process in which a content providing system provides content, according to an exemplary embodiment.

With reference to FIGS. 3, 7, and 9, the content reproduction device 101 may transmit the viewing information 911 to the server 102 for recommending content (operation S310). The viewing information 911 may be generated by the first controller 210 and may be transmitted to the server 102 for recommending content via the first communicator 230.

According to an exemplary embodiment, the viewing information 911 may be obtained from information input via the user interface 240 or information stored in the first storage unit 220. For example, the first controller 210 may determine content 912 that is being reproduced on the display 241 and generate the viewing information 911 including identification information of the content 912.

According to an exemplary embodiment, the first controller 210 may determine the content 912 that is being reproduced by using, for example, automatic content recognition (ACR). ACR is a technology of extracting and generating unique characteristics of multimedia as a database and recognizing optional content based on the database. However, ACR is merely an example for describing an exemplary embodiment. The content 912 that is being reproduced may be recognized by using other technology.

As another example, the first controller 210 may generate the viewing information 911 including a user identification (ID) that is input via the user interface 240. The first controller 210 may generate the viewing information 911 including user information such as an age 914 of a user, a region 915, a sex 916, and a preference 917 that match the user ID and are stored in the first storage unit 220.

As another example, the content reproduction device 101 may determine whether the user stops viewing content that is currently being reproduced. For example, when the user is not recognized through a camera included in the input apparatus 242, the content reproduction device 101 may determine that the user stops viewing the content that is currently being reproduced. The first controller 210 may generate the viewing information 911 including a reproduction time of the content that the user stops viewing.

However, these examples are only for describing an exemplary embodiment. The viewing information 911 may be obtained in various ways. The viewing information 911 generated by the first controller 210 may be stored in the first storage unit 220.

The server 102 for recommending content may generate recommended content information based on the viewing information 911 received from the content reproduction device 101 (operation S320). The server 102 for recommending content may receive the viewing information 911 from a plurality of content reproduction devices 101.

The recommended content information is information for selecting content that is to be recommended based on the viewing information 911.

The recommended content information may include identification information for identifying content. For example, the server 102 for recommending content may collect viewing information including information regarding a broadcast channel that is viewed via the plurality of content reproduction devices 101. The server 102 for recommending content may generate the recommended content information including information regarding a broadcast channel having a highest viewing rate, i.e., viewing frequency.

According to an exemplary embodiment, the recommended content information may further include additional information related to recommended content selected based on the viewing information 911. For example, the recommended content information may further include an infographic regarding a statistics result generated based on the viewing information 911. An infographic is a visual representation of information created to transfer specific information by using visual means.

The content reproduction device 101 requests the server 102 for recommending content to recommend content (operation S330), the server 102 for recommending content may transmit the recommended content information to the content reproduction device 101 (operation S340). That is, the content reproduction device 101 may request the recommended content information from the server 102 for recommending content. The recommended content information may include information used to identify content that is to be reproduced by the content reproduction device 101. For example, the recommended content information may include EPG information, URL information of content, or metadata of the content. As another example, the recommended content information may include connection information for accessing content. The connection information for accessing the content may include, for example, URL information for accessing the content, broadcast channel information for receiving the content, and information regarding a content provider that provides an EPG or content.

According to an exemplary embodiment, when the content reproduction device 101 is turned on, the content reproduction device 101 may request the recommended content information from the server 102 for recommending content. That is, when the user turns the content reproduction device 101 on, the content reproduction device 101 may allow the user to view recommended content or information regarding the recommended content on a first screen output by the content reproduction device 101.

According to another exemplary embodiment, when a content reproduction mode of the content reproduction device 101 is a content recommendation mode, the content reproduction device 101 may request the recommended content information from the server 102 for recommending content. According to an exemplary embodiment, the content reproduction device 101 may set the content reproduction mode as the content recommendation mode when previously set gesture information is input.

The recommended content information received by the content reproduction device 101 from the server 102 for recommending content may be recommended content information corresponding to a time when the content reproduction device 101 requests the recommended content information from the server 102 for recommending content. For example, the server 102 for recommending content may periodically update the recommended content information based on a plurality of pieces of viewing information received from a plurality of content reproduction devices. The server 102 for recommending content may transmit most recently updated recommended content information to the content reproduction device 101.

According to another exemplary embodiment, the content reproduction device 101 may transmit user information of the content reproduction device 101 to the server 102 for recommending content. The user information may include information regarding a user of the content reproduction device 101. For example, the content reproduction device 101 may perform image recognition on an image obtained via a camera included in the content reproduction device 101 and may obtain the user information including information such as an age of the user, sex, etc., as a result of image recognition. The user information may include at least one of identification information of the user such as a service ID, information regarding the sex of the user, information regarding the age of the user, and information regarding preference content of the user. For example, the server may generate a user profile based on the user information. However, an exemplary embodiment is not limited thereto.

The content reproduction device 101 may select content based on the received recommended content information (operation S350). For example, when content includes an image reproduced by using a broadcast channel, the first controller 210 of the content reproduction device 101 may select the broadcast channel that may receive the content by using EPG information included in the recommended content information. As another example, when the recommended content information includes information regarding the broadcast channel, the content reproduction device 101 may tune the broadcast channel for receiving a broadcast signal based on the information regarding the broadcast channel.

The content reproduction device 101 may receive the selected content from the content provider 103 (operation S360). For example, the content reproduction device 101 may receive a broadcast image by using the broadcast channel selected in operation S350. As another example, the content reproduction device 101 may access a moving image by using URL information regarding the content selected in operation S350. When the content selected in operation S350 is content stored in the first storage unit 220, operation S360 may be skipped.

The content reproduction device 101 may output the selected content on the display 241. That is, the content reproduction device 101 may recommend the selected content to the user (operation S370). According to an exemplary embodiment, the content reproduction device 101 may periodically change reproduced content. For example, since viewing rate information included in the recommended content information changes, the content reproduction device 101 may change a broadcast channel for reproducing the content to reproduce a broadcast channel having a highest viewing rate. For example, the viewing rate information may relate to a number of times the certain content is watched, a total time the certain content is watched, and/or a viewing rating, i.e., a number of "stars" the users afford to the certain content. As described above, the viewing information may be statistically collected and fine-tuned for a certain user. According to an exemplary embodiment, operation S310 may be skipped. For example, when the user turns the content reproduction device 101 on, since the content reproduction device 101 is not reproducing content, the content reproduction device 101 does not perform operation S310 of transmitting the viewing information 911 to the server 102 for recommending content. The content reproduction device 101 may receive recommended content information that is generated by the server 102 for recommending content based on viewing information collected from another content reproduction device or collected in advance and stored.

Figure 4:
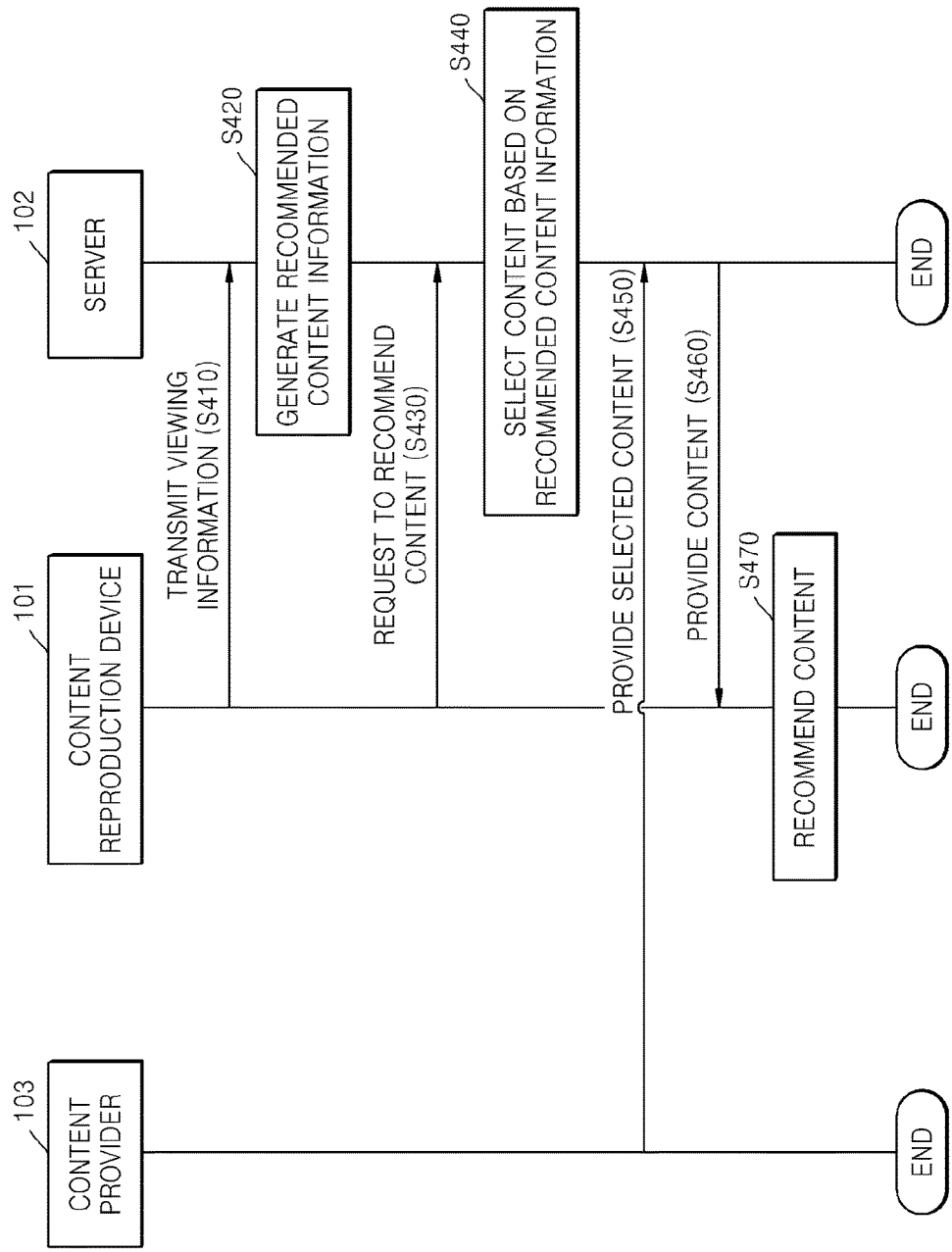
FIG. 4 is a flowchart of a process in which a content providing system provides content, according to another exemplary embodiment.

FIG. 4 is a flowchart of a process in which a content providing system provides content, according to another exemplary embodiment. The operations similar to those described above with reference to FIG. 3 are not repeated here.

The content reproduction device 101 may transmit the viewing information 911 to the server 102 for recommending content (operation S410). The viewing information 911 may be generated by the first controller 210 and may be transmitted to the server 102 for recommending content via the first communicator 230.

The server 102 for recommending content may generate recommended content information based on the viewing information 911 received from the content reproduction device 101 (operation S420). The server 102 for recommending content may receive the viewing information 911 from a plurality of content reproduction devices 101. The recommended content information may include identification information for identifying content that is to be reproduced by the content reproduction device 101. For example, the recommended content information may include EPG information, URL information of content, or metadata of the content.

The content reproduction device 101 requests the server 102 for recommending content to recommend content (operation S430), and the server 102 for recommending content may select content based on the received recommended content information (operation S440). For example, the server 102 for recommending content may select content by using metadata such as a title of an image included in the recommended content information.

The server 102 for recommending content may receive the selected content from the content provider 103 (operation S450). However, when the content selected in operation S440 is content stored in the first storage unit 220, operation S450 may be skipped.

The server 102 for recommending content may provide the selected content to the content reproduction device 101 (operation S460). For example, when the server 102 for recommending content selects image content in operation S440, the server 102 for recommending content may provide an image stream or an image file to the content reproduction device 101 according to a transmission method of the selected content.

The content reproduction device 101 may recommend the content provided by the content provider 103 on the display 241 (operation S470). According to an exemplary embodiment, the content reproduction device 101 may periodically change content reproduced by the content reproduction device 101 to reproduce the content received in operation S460. For example, the content reproduction device 101 may sequentially output broadcast channels having first through third viewing rates that are included in the recommended content information.

According to an exemplary embodiment, operation S410 may be skipped.

Figure 5:
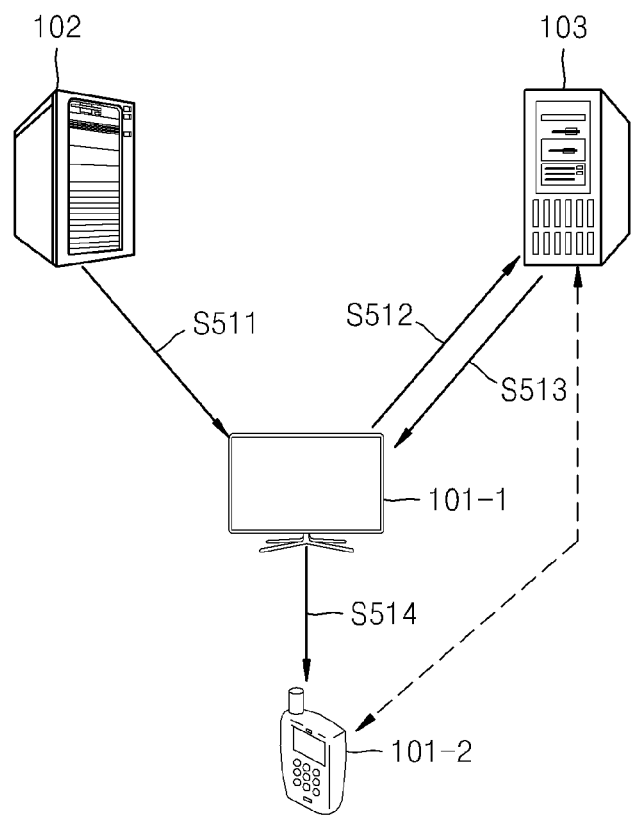
FIG. 5 is a diagram of an operation of a content providing system, according to an exemplary embodiment.

FIG. 5 is a diagram for describing an operation of a content providing system, according to an exemplary embodiment. In the present exemplary embodiment, a first content reproduction device 101-1 may communicate with the server 102 for recommending content and the content provider 103. The first content reproduction device 101-1 may be connected to a second content reproduction device 101-2 to transmit and receive data.

According to an exemplary embodiment, the server 102 for recommending content may transmit recommended content information generated based on viewing information received from a plurality of content reproduction devices to the first content reproduction device 101-1 (operation S511).

The first content reproduction device 101-1 or the second content reproduction device 101-2 may select content based on the received recommended content information. The first content reproduction device 101-1 may request the selected content from the content provider 103 (operation S512), and may receive the content from the content provider 103 (operation S513). When a method of receiving the selected content does not need to transmit a request to the content provider 103, as in the case of a broadcast, operation S512 may be skipped.

The first content reproduction device 101-1 that received the content may transmit the received content to the second content reproduction device 101-2 (operation S514). The second content reproduction device 101-2 displays the received content, thereby recommending the content selected based on the viewing information.

According to another exemplary embodiment, in operation S512, the first content reproduction device 101-1 may transmit connection information of the second content reproduction device 101-2 along with a request for the content. In this case, the content provider 103 may be connected to the second content reproduction device 101-2 and provide the content to the second content reproduction device 101-2.

FIG. 6 is a diagram for describing an operation of a content providing system, according to another exemplary embodiment. In the present exemplary embodiment, a first content reproduction device 101-1 may communicate with the server 102 for recommending content and the content provider 103. The first content reproduction device 101-1 may be connected to a second content reproduction device 101-2 to transmit and receive data.

According to an exemplary embodiment, the first content reproduction device 101-1 may request the server 102 for recommending content to recommend content (operation S621), so that the server 102 for recommending content may select recommended content and receive the selected content from the content provider 103. The first content reproduction device 101-1 may transmit viewing information to the server 102 for recommending content. The first content reproduction device 101-1 may transmit connection information of the second content reproduction device 101-2 connected to the first content reproduction device 101-1. The connection information may be information for connecting the first content reproduction device 101-1 to the second content reproduction device 101-2 like an IP address of the second content reproduction device 101-2 or a media access control (MAC) address.

The server 102 for recommending content may receive the content from the content provider 103 (operation S622).

The server 102 for recommending content may store the content received from the content provider 103 before operation S621 is performed. That is, the content provider 103 may register content to be provided to the first content reproduction device 101-1 to the server 102 for recommending content in advance.

The server 102 for recommending content may be connected to the second content reproduction device 101-2 and provide the selected content to the second content reproduction device 101-2 (operation S623). The second content reproduction device 101-2 displays the selected content, thereby recommending the content to a user.

FIG. 7 is a table 970 containing the viewing information 911, according to an exemplary embodiment.

According to an exemplary embodiment, the viewing information 911 may include user information 972, such as a user ID 913 ("G99"), an age 914 ("30"), a region 915 ("Seoul"), a sex 916 ("male"), and a preference 917 ("Sports"), for identifying a user, and content information 974 such as channel information 976 (Channel number "41") and a content ID 978 ("X88"), for identifying the content. According to an exemplary embodiment, the viewing information 911 may include only the content information or only the user information.

The user ID is identification information for identifying the user and may be information registered in the server 102 for recommending content. The age may include information regarding an age of the user. The region may include information regarding a location in which the content reproduction device 101 is used. The sex may include information regarding a sex of the user. The preference may include information regarding a type of content preferred by the user.

According to an exemplary embodiment, the user information such as the age, the region, the sex, and the preference may be information that may match the user ID and may be stored in the first storage unit 220.

According to another exemplary embodiment, the user information such as the age, the region, the sex, and the preference may be generated by the first controller 210. For example, a user included in an image obtained via a camera (not shown) included in the content reproduction device 101 is recognized, and thus the first controller 210 may estimate the age of the user and the sex. As another example, the first controller 210 may generate information regarding the region by using a Global Positioning System (GPS) coordinate obtained from a GPS unit included in the content reproduction device 101. As another example, the first controller 210 may generate the information regarding the type of the content preferred by the user from a history of content used by the user.

The user information may include a part of the user ID, the age, the region, the sex, and the preference. For example, the user information may include only the user ID, and the information regarding the age, the region, the sex, and the preference may match the user ID and may be stored in the second storage unit 260. The server 102 for recommending content may search for the information regarding the age, the region, the sex, and the preference that match the user ID by using the user ID included in the viewing information 911.

Although the viewing information 911 includes user information of a single user in FIG. 9, the viewing information 911 may include user information of a plurality of users according to exemplary embodiments. For example, when a plurality of males in their 20s view content via the content reproduction device 101, the viewing information 911 may include user information of the plurality of males in their 20s. The server 102 for recommending content that received the viewing information 911 may generate recommended content information indicating a channel having a high viewing rate among sports channels. As another example, when user information of the age includes 10s, 20s, and 40s age groups, the content recommendation server 120 may generate recommended content information indicating content that is recommended to families.

Figure 8:
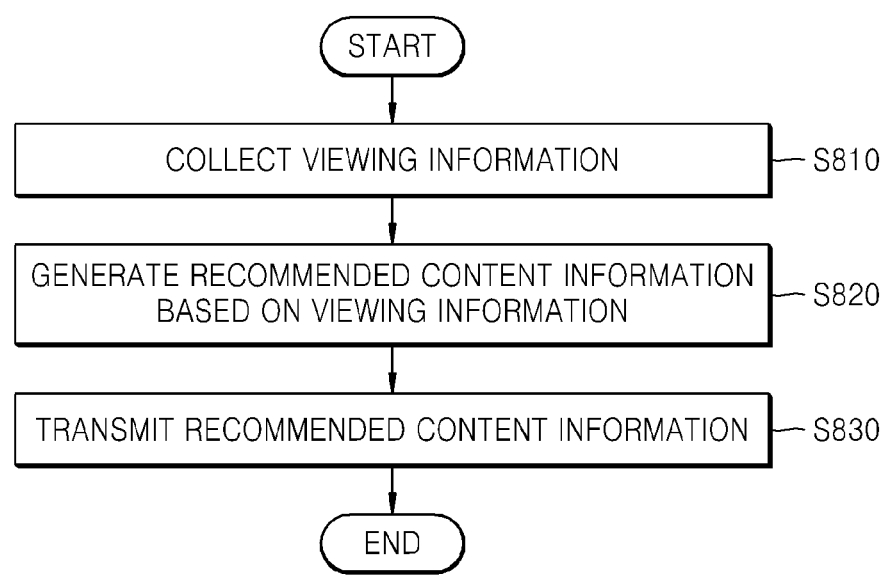
FIG. 8 is a flowchart of a process in which a content recommendation server provides recommended content information, according to an exemplary embodiment.

FIG. 8 is a flowchart of a process in which the server 102 for recommending content provides recommended content information, according to an exemplary embodiment.

The server 102 for recommending content may collect the viewing information 911 received from the content reproduction device 101 (operation S810). The server 102 for recommending content may collect the viewing information 911 from a plurality of content reproduction devices 101.

The server 102 for recommending content may generate recommended content information based on the viewing information 911 (operation S820). The server 102 for recommending content may determine the recommended content information such as recommended content, items related to content, a content type, and a content transmission method based on the viewing information 911. However, an exemplary embodiment is not limited thereto.

According to an exemplary embodiment, the server 102 for recommending content may generate the recommended content information based on content information included in the viewing information 911, user information, or a combination of these. For example, the server 102 for recommending content may generate recommended content information including identification information of content that males in their 20s view most.

According to an exemplary embodiment, the server 102 for recommending content may transmit the generated recommended content information to the content reproduction device 101 (operation S830).

According to another exemplary embodiment, the server 102 for recommending content may transmit the recommended content information to the content provider 103. The server 102 for recommending content may transmit identification information of the content reproduction device 101 that is to receive content and information for requesting the content provider 103 to provide the content to the content reproduction device 101 to the content provider 103.

FIG. 9 is a detailed block diagram for describing a process in which the server 102 for recommending content generates recommended content information, according to an exemplary embodiment. The server 102 for recommending content may include an information obtainer 910 and an analyzer 920. The information obtainer 910 and the analyzer 920 may operate on the first controller 210 or the second controller 250. The information obtainer 910 and the analyzer 920 may operate by using the second software 262.

The information obtainer 910 may collect the viewing information 911 received via the second communicator 270. The information obtainer 910 may collect the viewing information 911 received from a plurality of content reproduction devices 101.

The viewing information 911 may include content identification information 912 for identifying content that is being reproduced by the content reproduction device 101 and information regarding the content that is being reproduced by the content reproduction device 101 such as a user ID 913, an age 914 of a user, a region 915, a sex 916, and a preference 917 for identifying a user of the content reproduction device 101.

The information obtainer 910 may be connected to the analyzer 920. The analyzer 920 may analyze the viewing information 911 obtained via the information obtainer 910. The second controller 250 may generate the recommended content information based on an analysis result of the analyzer 920.

According to an exemplary embodiment, the analyzer 920 may compute statistics 930 regarding the viewing information 911. For example, the analyzer 920 may compute viewing rate statistics of a broadcast channel that is being viewed in the content reproduction device 101 that transmits the viewing information 911 to the server 102 for recommending content. The recommended content information including the viewing rate statistics computed by the analyzer 920 is generated and transmitted to the content reproduction device 101, and thus the content providing system 100 may select a broadcast channel according to a viewing rate computed by the content reproduction device 101 in real time. The content reproduction device 101 may reproduce a broadcast image received via the selected broadcast channel.

According to another exemplary embodiment, the analyzer 920 may compute combination statistics of the content identification information 912, the age 914 of the user, the region 915, the sex 916, and the preference 917. For example, the analyzer 920 may obtain the age 914 of the user, the region 915, the sex 916, and the preference 917 that match the user ID 910 included in the viewing information 911 and are stored in the second storage unit 260. Alternatively, the analyzer 920 may obtain the age 914 of the user, the region 915, the sex 916, and the preference 917 that are included in the viewing formation 911. The analyzer 920 may compute viewing rates such as "viewing rates of broadcast channels by males in their 30s who like sports in Seoul".

According to an exemplary embodiment, when a type of the content reproduced by the content reproduction device 101 is multimedia data reproduced via the broadcast channel, the analyzer 920 may compute the viewing rate. Alternatively, when the type of the content is a VOD or moving image file, the analyzer 920 may compute statistics regarding the number of times that the content is reproduced for a predetermined period of time. The viewing rate or the number of times that the content is reproduced is merely exemplary, and an exemplary embodiment is not be limited thereto.

According to an exemplary embodiment, the second controller 250 may generate the recommended content information including the viewing rate of the content or the number of times that the content is reproduced. Alternatively, the second controller 250 may generate the recommended content information including content identification information for identifying content selected based on the viewing rate of the content or the number of times that the content is reproduced.

According to an exemplary embodiment, the analyzer 920 may analyze information regarding related items 940 included in the content. For example, the analyzer 920 may analyze the information regarding related items 940 such as a place included in a moving image, and accessories and clothes that a person included in the moving image wears. The second controller 250 may generate the recommended content information including the information regarding related items 940.

According to an exemplary embodiment, the analyzer 920 may determine a type 950 of the content. For example, the analyzer 920 may determine a type of content selected according to the viewing rate among an image 951, sound 952, and text 953. The second controller 250 may generate the recommended content information including information regarding the type 950 of the content.

According to an exemplary embodiment, the analyzer 920 may determine a transmission method 960 of the content. For example, the analyzer 920 may determine a method in which the content reproduction device 101 receives the content selected according to the viewing rate among a public TV receiving method, an Internet protocol TV (IPTV) receiving method, a cable broadcast receiving method, a VOD or Internet moving image receiving method. The second controller 250 may generate the recommended content information including information regarding the transmission method 960 of the content.

The second controller 250 may generate the recommended content information including information regarding recommended content such as an EPG, URL information of the content or metadata of the content.

Figure 10:
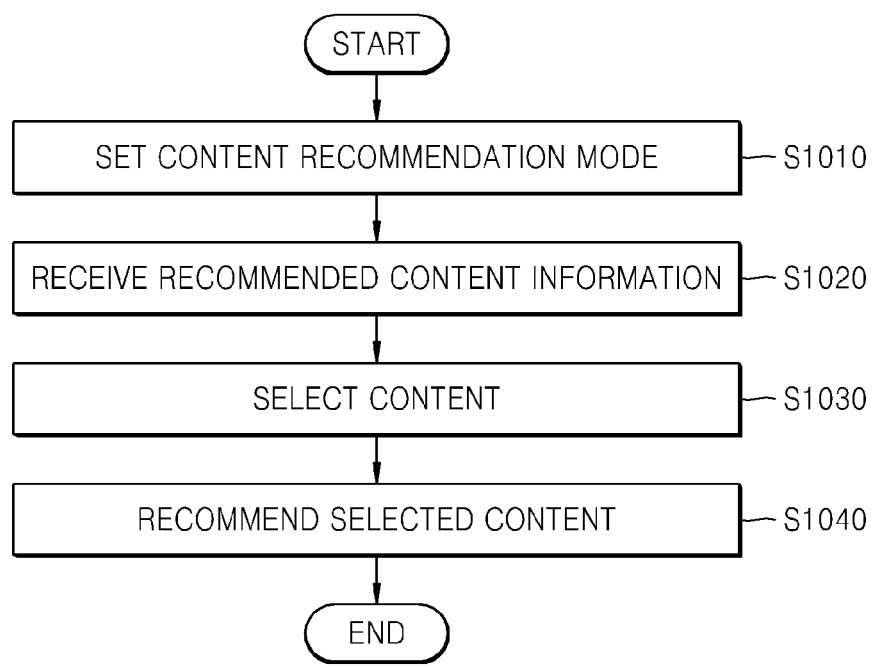
FIG. 10 is a flowchart of a process in which a content reproduction device provides content, according to an exemplary embodiment.

FIG. 10 is a flowchart of a process in which the content reproduction device 101 provides content, according to an exemplary embodiment.

The content reproduction device 101 may set a content reproduction mode to a content recommendation mode in response to a certain condition being satisfied (operation S1010). For example, the content reproduction device 101 may set the content reproduction mode to the content recommendation mode according to a user input received via the input apparatus 242. The user input may be implemented in various ways according to the exemplary embodiments.

For example, the certain condition may include one of turning on the content reproduction device 101, identifying a predetermined gesture, reproducing the content the predetermined number of times, and receiving a predetermined button input via a remote controller.

According to an exemplary embodiment, the user input for setting the content recommendation mode may be an input for turning the content reproduction device 101 on. For example, when the content reproduction device 101 is turned on, a broadcast image received via a broadcast channel having the highest viewing rate may be displayed on the display 241.

According to another exemplary embodiment, when the content reproduction device 101 recognizes a user input that is identical to a user input previously set in the content reproduction device 101 during the reproduction of the content, the second controller 250 may set the content recommendation mode. For example, when the content reproduction device 101 receives information regarding a specific gesture input or a button input from the remote controller, the second controller 250 may set the content recommendation mode. The gesture input may be information input via a physical movement of the remote controller. As another example, when specific gesture information is recognized from an image obtained via a camera included in the input apparatus 242, the second controller 250 may set the content recommendation mode.

The content reproduction device 101 may receive recommended content information from the server 102 for recommending content (operation S1020) via the first communicator 230. The first controller 210 may determine a content receiving method based on the received recommended content information. For example, when the recommended content information received from the server 102 for recommending content includes an EPG indicating a broadcast channel for receiving recommended content, the first controller 210 may display a broadcast image received via the corresponding broadcast channel on the display 241. As another example, when the recommended content information received from the server 102 for recommending content includes URL information that may be connected to the recommended content, the first controller 210 may access content stored in the content provider 103 by using the URL information. As another example, when the recommended content information received from the server 102 for recommending content includes metadata of the recommended content, the first controller 210 may search for content by using the metadata and allow the display 241 to display the searched content.

According to an exemplary embodiment, the content reproduction device 101 may transmit the viewing information 911 of content that is being reproduced by the content reproduction device 101 to the server 102 for recommending content via the first communicator 230.

The content reproduction device 101 may select content based on the recommended content information (operation S1030). The content reproduction device 101 may receive the selected content from the content provider 103.

According to an exemplary embodiment, the content reproduction device 101 may select content based on information regarding a user of the content reproduction device 101. For example, when the user of the content reproduction device 101 is recognized as a male in his 20s, the content reproduction device 101 may select content included in a sports category among the content selected based on the recommended content information. The information regarding the user of the content reproduction device 101 may be directly input by the user or may be obtained in various ways like image recognition.

According to an exemplary embodiment, operations S1020 and S1030 may be omitted, and the content reproduction device 101 may receive recommended content itself.

For example, when the content stored in the first storage unit 220 is selected by the first controller 210 based on the recommended content information received from the server 102 for recommending content, the content reproduction device 101 does not receive the content from the content provider 103 or the server 102 for recommending content and may search for the stored content.

According to another exemplary embodiment, the content reproduction device 101 may receive content from the content provider 103 via pushing. If the server 102 for recommending content that generates the recommended content information transmits the recommended content information and information for requesting the content provider 103 to provide content to the content reproduction device 101 to the content provider 103, the content provider 103 may transmit the recommended content to the content reproduction device 101.

The content reproduction device 101 may display the content received or the content stored in the first storage unit 220 (operation S1040).

According to an exemplary embodiment, the first controller 210 may periodically change content reproduced on the display 241. For example, the first controller 210 may allow the display 241 to sequentially display contents having first through third viewing rates among viewing rate statistics included in the recommended content information.

When the content recommendation mode is terminated according to a user input in the example, the first controller 210 may stop sequentially changing the displayed contents and may continuously reproduce the content that is being reproduced on the display 241 at a time when the content recommendation mode is terminated.

According to an exemplary embodiment, the first controller 210 may change the displayed content according to a specific user input or periodically without a user's permission. For example, in the content recommendation mode, the first controller 210 may change the displayed content when the button input of the remote controller is recognized.

According to an exemplary embodiment, when the content reproduced by the content reproduction device 101 is content received via a previously set channel such as a broadcast channel, the content reproduction device 101 may recommend the content by using a virtual channel. The virtual channel is not a communication channel for receiving actual content but may be a content reproduction mode for a selection of the user. For example, when a channel 100 of a TV is previously set as the virtual channel, if the user selects the channel 100 from among output broadcast channels, the TV may output an image received via a broadcast channel selected based on the recommended content information. Accordingly, the user may view a broadcast channel recommended by the TV via the channel 100.

According to an exemplary embodiment, the first controller 210 may allow the content determined based on the recommended content information to be displayed in a picture-in-picture (PIP) format by which the content is displayed on a part of an image that is being reproduced before the content recommendation mode is set. According to another exemplary embodiment, the first controller 210 may allow a title of the content determined based on the recommended content information to be displayed on a part of an image output via the display 241 in a message format.

Figure 11:
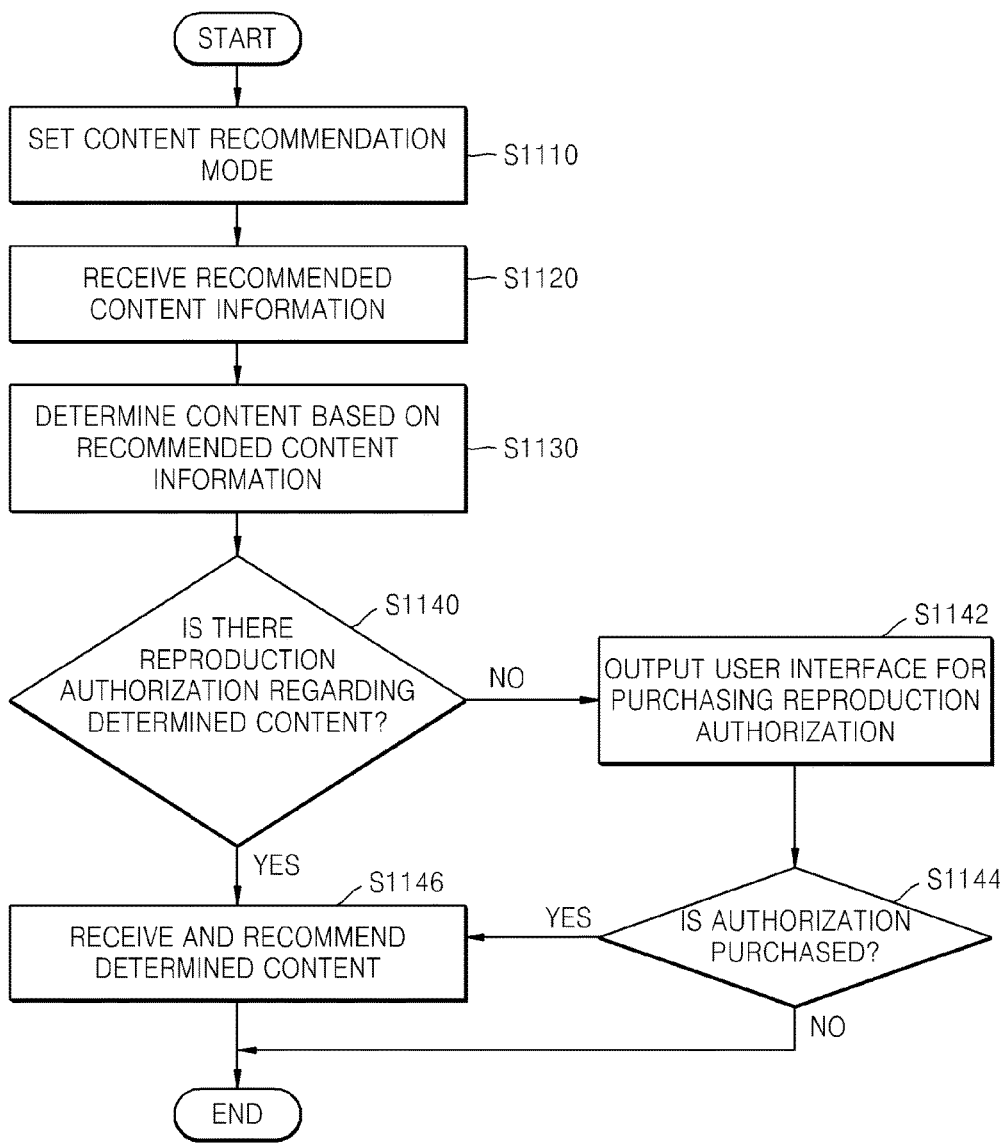
FIG. 11 is a flowchart of a process in which a content reproduction device reproduces content, according to an exemplary embodiment.

FIG. 11 is a flowchart of a process in which the content reproduction device 101 reproduces content according to reproduction authorization regarding the content, according to an exemplary embodiment. The operations similar to those described above with reference to FIG. 10 are not repeated here.

The content reproduction device 101 may set a content recommendation mode according to a user input via the input apparatus 242 (operation S1110). The user input may be implemented in various ways according to the embodiments.

According to an exemplary embodiment, the user input for setting the content recommendation mode may be an input for turning the content reproduction device 101 on. That is, for example, when the content reproduction device 101 is turned on, a broadcast image received via a broadcast channel having a highest viewing rate may be displayed on the display 241. As another example, when a user inputs a command to change channels more than a predetermined number of times for a predetermined period of time to the content reproduction device 101, the content reproduction device 101 may set the content recommendation mode to sequentially reproduce contents that are included in recommended content information and are selected in the order of viewing rates.

According to another exemplary embodiment, when the content reproduction device 101 recognizes a user input that is identical to a user input previously set in the content reproduction device 101 during the reproduction of content, the second controller 250 may set the content recommendation mode. For example, when the content reproduction device 101 receives information regarding a specific gesture input or a button input from a remote controller, the second controller 250 may set the content recommendation mode. The gesture input may be information input via a physical movement of the remote controller. As another example, when specific gesture information is recognized from an image obtained via a camera included in the input apparatus 242, the second controller 250 may set the content recommendation mode.

The content reproduction device 101 may receive the recommended content information from the server 102 for recommending content via the first communicator 230 (operation S1120) and may determine content based on the recommended content information (operation S1130). The first controller 210 may further determine whether there is reproduction authorization regarding the determined content (operation S1140). The first controller 210 may determine whether a user is authorized to reproduce the content via the server 102 for recommending content or the content provider 103 by using user information of the content reproduction device 101.

When the first controller 210 determines that there is no reproduction authorization regarding the content, the content reproduction device 101 may output a user interface for purchasing the reproduction authorization regarding the content via the user interface 240 (operation S1142).

In operation S1144, it may be determined that the user purchased the reproduction authorization, and, thus, the reproduction authorization regarding the content is obtained. The content reproduction device 101 may receive the determined content from the content provider 103, and the first controller 210 may display the received content on the display 241 (operation S1146).

If the user does not purchase the reproduction authorization, it is determined that the reproduction authorization regarding the content is not obtained, and the first controller 210 does not display the content determined in operation S1130 on the display 241.

Figure 12:
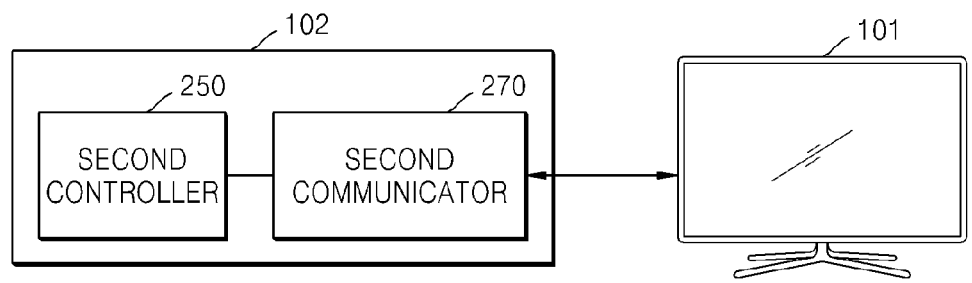
FIG. 12 is a schematic block diagram of a content recommendation server, according to an exemplary embodiment.

FIG. 12 is a schematic block diagram of the server 102 for recommending content, according to an exemplary embodiment.

The server 102 for recommending content according to an exemplary embodiment may include the second communicator 270 that communicates with the content reproduction device 101, and the second controller 250 that receives the viewing information 911 of content that is being reproduced by the content reproduction device 101 from the content reproduction device 101 via the second communicator 270 and transmits recommended content information generated based on the received viewing information 911 to the content reproduction device 101 via the second communicator 270. The second communicator 270 may receive the viewing information 911 of the content that is being reproduced from a plurality of content reproduction devices 101 and transmit the recommended content information to at least one of the plurality of content reproduction devices 101.

Figure 13:
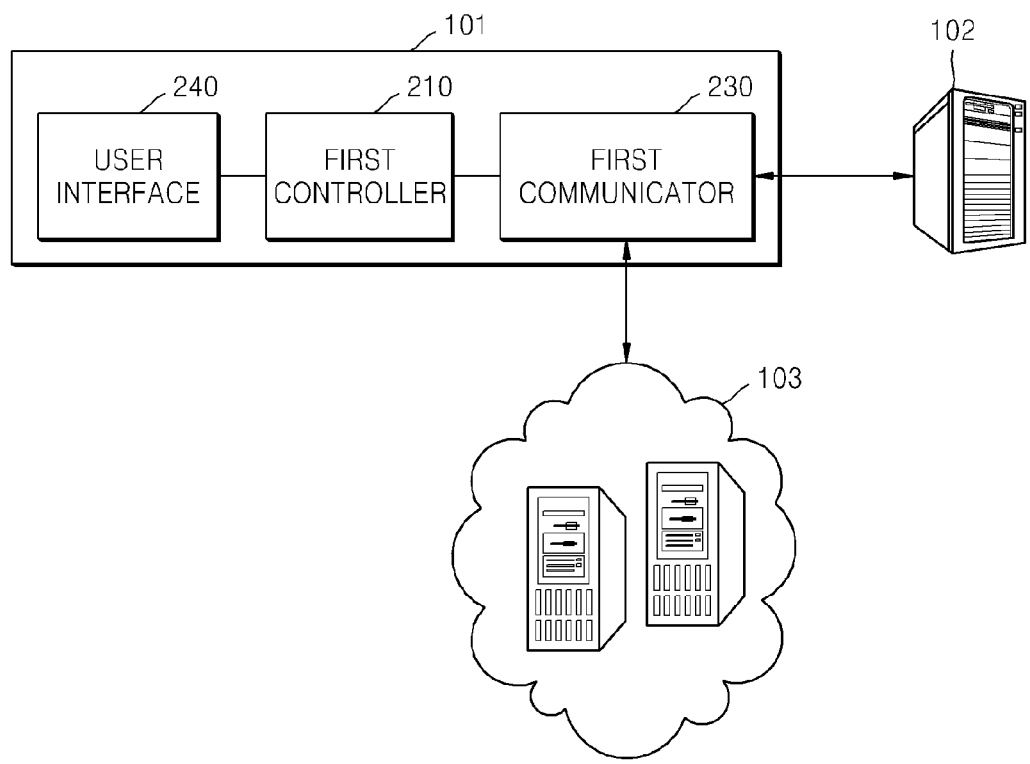
FIG. 13 is a schematic block diagram of a content reproduction device, according to an exemplary embodiment.

FIG. 13 is a schematic block diagram of the content reproduction device 101, according to an exemplary embodiment.

The content reproduction device 101 according to an exemplary embodiment may include the first communicator 230 that communicates with the server 102 for recommending content, the first controller 210 that transmits the viewing information 911 of content that is being reproduced by the content reproduction device 101 to the server 102 for recommending content via the first communicator 230 and determines content that is to be reproduced based on recommended content information received from the server 102 for recommending content via the first communicator 230, and the user interface 240 that outputs the determined content.

The content reproduction device 101 according to another exemplary embodiment may include the first communicator 230 that communicates with the server 102 for recommending content and the content provider 103, the first controller 210 that transmits the viewing information 911 of content that is being reproduced by the content reproduction device 101 to the server 102 for recommending content via the first communicator 230 and selects content based on recommended content information generated by the server 102 for recommending content based on the viewing information 911, and the user interface 240 that outputs the selected content.

Although not shown in FIG. 13, the content reproduction device 101 may include a mode selection module according to an exemplary embodiment. A content reproduction mode of the content reproduction device 101 is set to a content recommendation mode by using the mode selection module, and thus the content reproduction device 101 may recommend content.

The mode selection module may set the content reproduction mode to the content recommendation mode if a previously set condition related to a state of the content reproduction device 101 is satisfied, as described in detail above.

FIGS. 14A to 14D are diagrams for describing a content reproduction process, according to an exemplary embodiment.

Figure 14A:
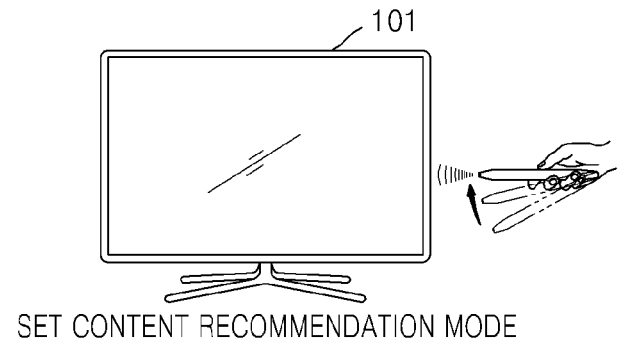
FIGS. 14A, 14B, 14C, and 14D are diagrams of a content reproduction process, according to an exemplary embodiment.

With reference to FIG. 14A, the content reproduction device 101 may set a content recommendation mode according to a first user input. For example, the user's input may correspond to a gesture, i.e., the remote controller gesture, or to a button input for initiating the content recommendation mode.

Figure 14B:
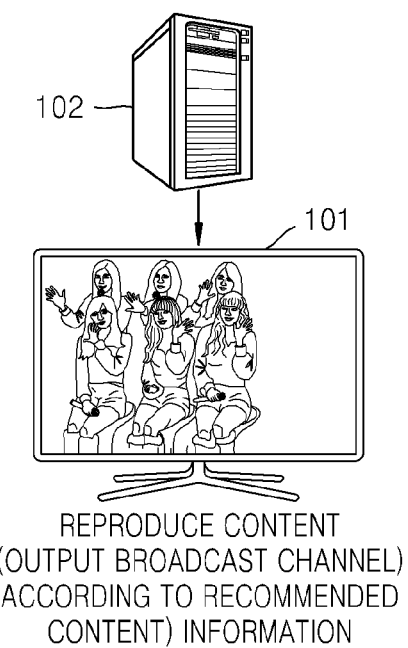

With reference to FIG. 14B, the content reproduction device 101 may reproduce content according to recommended content information received from the server 102 for recommending content.

Figure 14C:
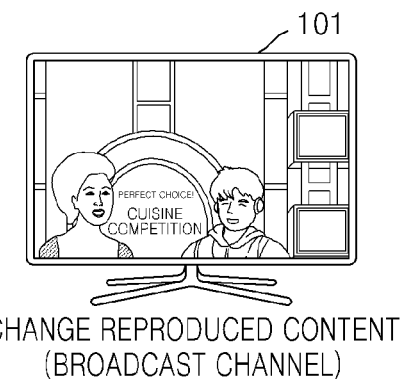

With reference to FIG. 14C, the content reproduction device 101 may perform an operation of recommending the content by sequentially changing the reproduced content according to the recommended content information. For example, the content reproduction device 101 may automatically reproduce shorter portions of the recommended content, e.g., representative scenes, clips, or timed portions, in succession, for example, based on the viewing rating information for a user. As another example, the content reproduction device 101 may change the content reproduced based on the viewing rating information in response to receiving a second user input. For example, the user's input may correspond to a gesture, i.e., the remote controller gesture, or to a button input for changing the content or a channel.

Figure 14D:
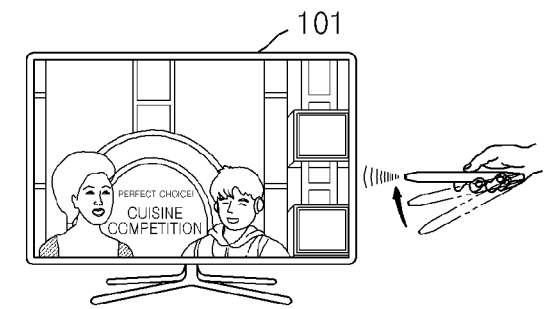

With reference to FIG. 14D, the content reproduction device 101 may terminate the content recommendation mode according to a third user input and may continuously reproduce the content that is being reproduced when the content recommendation mode is terminated, i.e., a third user input is received. For example, the user's input may correspond to a gesture, i.e., the remote controller gesture, or to a button input for terminating the content recommendation mode.

FIGS. 15A to 15D are diagrams for describing a content reproduction process, according to another exemplary embodiment.

Figure 15A:
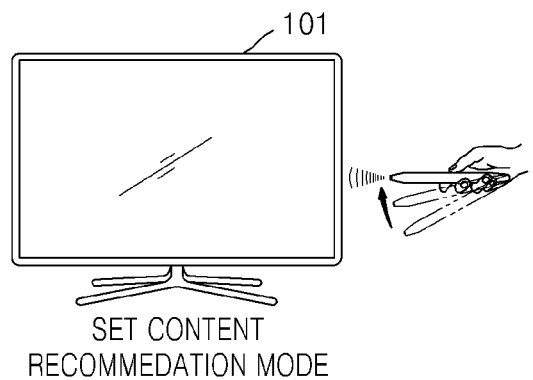
FIGS. 15A, 15B, 15C, and 15D are diagrams of a content reproduction process, according to another exemplary embodiment.

With reference to FIG. 15A, the content reproduction device 101 may set a content recommendation mode according to a user input, as described above.

Figure 15B:
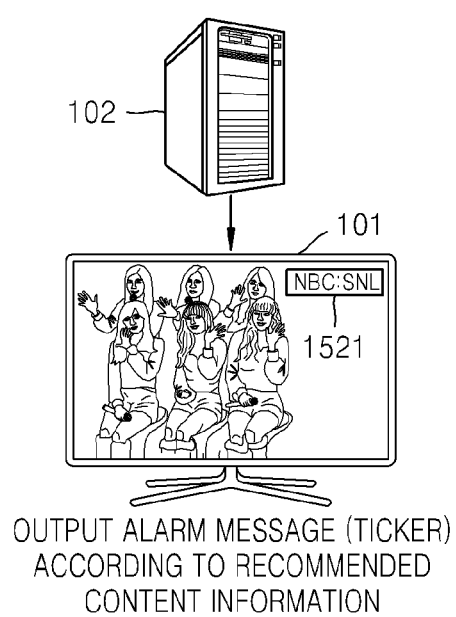

With reference to FIG. 15B, the content reproduction device 101 may output an alarm message 1521 including information regarding recommended content on a part of an image displayed on the display 241 according to recommended content information received from the server 102 for recommending content.

Figure 15C:
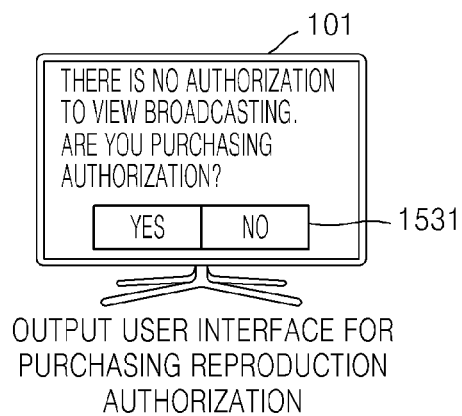

With reference to FIG. 15C, when the alarm message 1521 is selected based on information input via the input apparatus 242, the first controller 210 may determine whether there is reproduction authorization regarding content corresponding to the displayed alarm message 1521. When the first controller 210 determines that there is no reproduction authorization regarding the content, the first controller 210 may output a user interface 1531 for purchasing the reproduction authorization on the display 241.

Figure 15D:
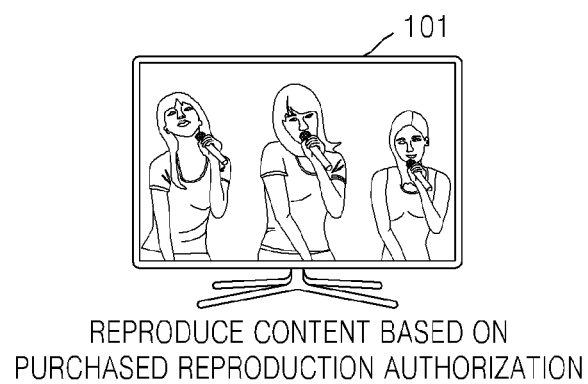

With reference to FIG. 15D, when the reproduction authorization regarding the content is obtained via the user interface 1531, i.e., purchased, the content reproduction device 101 may reproduce the content based on the purchased reproduction authorization.

Figure 16:
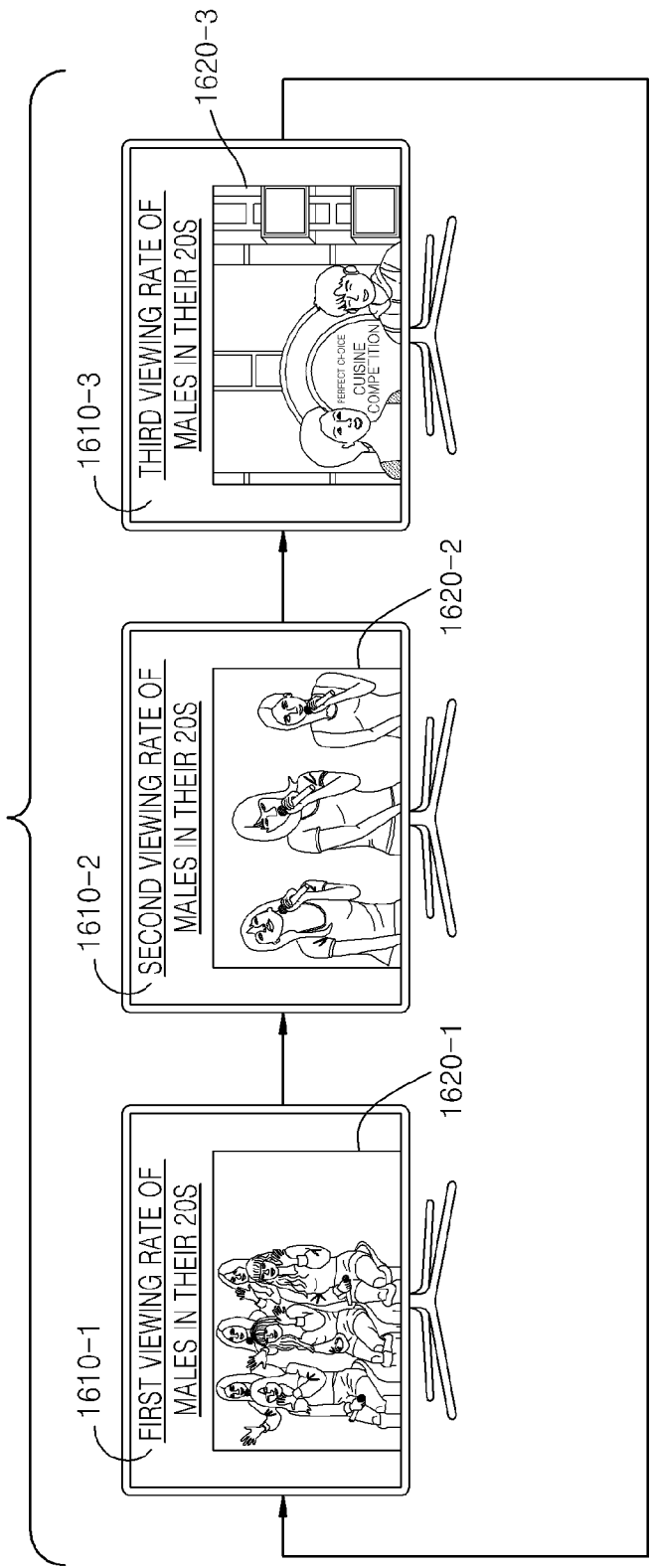
FIG. 16 is a diagram of an operation in which a content reproduction device displays pieces of content, according to an exemplary embodiment.

FIG. 16 is a diagram for describing an operation in which the content reproduction device 101 sequentially displays a plurality of pieces of contents 1610-1, 1610-2, and 1610-3 selected based on recommended content information, according to an exemplary embodiment.

According to an exemplary embodiment, the content reproduction device 101 may also display information regarding the displayed contents 1620-1, 1620-2, and 1620-3. For example, the content reproduction device 101 may display reasons 1610-1, 1610-2, and 1610-3 for selecting the displayed contents 1620-1, 1620-2, and 1620-3, i.e., criteria based on which the recommendation was performed. The information regarding the displayed contents and the recommended content information may be received from the server 102 for recommending content.

Figure 17:
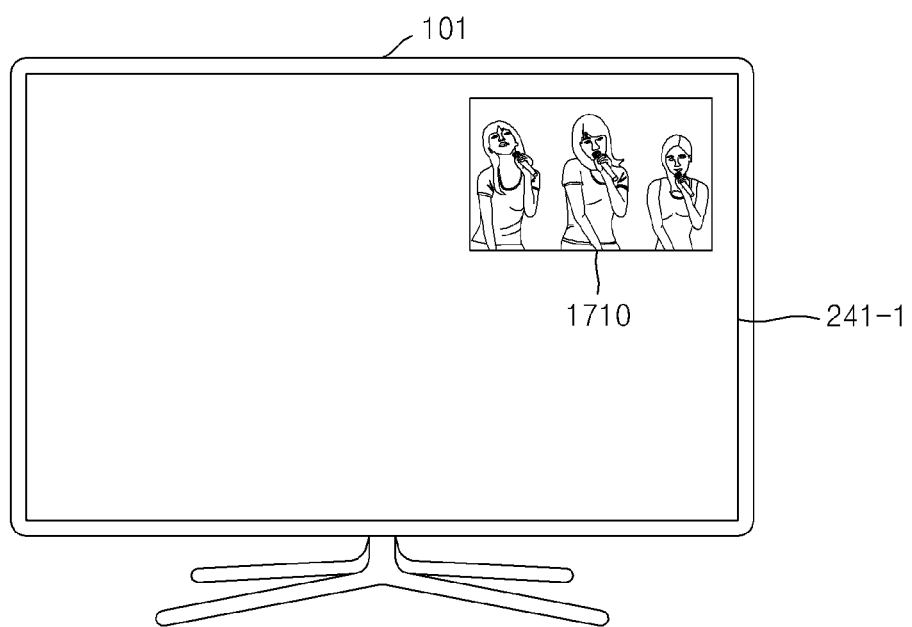
FIG. 17 is a diagram of an operation in which a content reproduction device displays content, according to an exemplary embodiment.

FIG. 17 is a diagram for describing an operation in which the content reproduction device 101 displays content on a part of an image, according to an exemplary embodiment.

According to an exemplary embodiment, the content reproduction device 101 may display content determined based on recommended content information in a PIP format 1710 by which the content is displayed on a part of an image that is being reproduced before a content recommendation mode is set.

According to another exemplary embodiment, the content reproduction device 101 may display a title of the content determined based on the recommended content information on a part of an image output via the display 241 in a message format.

An exemplary embodiment may be realized in a form of a recording medium including a program module executed by a computer and a command executed by the same computer. A computer-readable medium includes an arbitrary available medium, for example, volatile and non-volatile media and removable and non-removable media. A computer-readable medium may include a computer storage medium and a communication medium. The computer storage medium includes volatile and non-volatile media and removable and non-removable media, which are realized through an arbitrary method or technique for storing information on a computer-readable command, a data structure, a program module, or other data. The communication medium typically includes a computer-readable command, a data structure, a program module, or other data of a modulated data signal.

The foregoing exemplary embodiments and advantages are merely exemplary and are not to be construed as limiting. The present teaching can be readily applied to other types of apparatuses. The description of the exemplary embodiments is intended to be illustrative, and not to limit the scope of the claims, and many alternatives, modifications, and variations will be apparent to those skilled in the art. For example, each single component may be separated into multiple components which are then separately implemented. Also, separated components may be combined together and implemented as a single component.

What is claimed is:

1. A content reproduction device comprising:
a user input receiver configured for receiving a user input;
a communicator which includes a transceiver and is configured for requesting a server for recommended content information based on the user input and receiving from the server the recommended content information as a response to the requesting;
a controller which includes a microprocessor and is configured to select content based on the received recommended content information; and
a display configured for outputting the content,
wherein the recommended content information is information for selecting the content that is generated by the server according to viewing information related to a number of times the content is reproduced in other content reproduction devices, users of which are different from a first user of the content reproduction device, and is generated by the server further based on a first user identification information of the first user and additionally based on a second user identification information of the users,
wherein the controller is further configured to select pieces of the content based on the recommended content information, and
wherein the display is further configured for outputting the selected pieces of the content in succession one after another in an order from a highest number to a lowest number of times the content was reproduced in the other content reproduction devices, on a screen of the content reproduction device, in response to the user input for turning on the content reproduction device that is received through the user input receiver.

2. The content reproduction device of claim 1, wherein the communicator is further configured for requesting the server for the recommended content information in response to the content reproduction device being turned on, and
the display is further configured for outputting the selected pieces of the content on an area of the screen.

3. The content reproduction device of claim 1, wherein the controller is further configured to set a content reproduction mode of the content reproduction device to a content recommendation mode, and
the communicator is further configured for requesting the server for the recommended content information, in response to the content recommendation mode being set.

4. The content reproduction device of claim 3, wherein the controller is further configured to set the content recommendation mode in response to a gesture input being detected as a gesture which has been defined and stored in advance as corresponding to setting the content recommendation mode.

5. The content reproduction device of claim 3, wherein the controller is further configured to set the content recommendation mode when a number of times the content reproduced by the content reproduction device is changed, based on the user input for changing the content, becomes equal to or greater than a preset value.

6. The content reproduction device of claim 1, wherein the content is reproduced by using a broadcast signal received through a broadcast channel,
the recommended content information comprises information about the broadcast channel, and
the controller is further configured to tune the broadcast channel, which is output through the display, based on the information about the broadcast channel.

7. The content reproduction device of claim 1, wherein the recommended content information comprises connection information for accessing the selected pieces of the content, and
the communicator is further configured for receiving the selected pieces of the content by using the connection information.

8. The content reproduction device of claim 1, wherein the communicator is further configured for transmitting the first user identification information to the server.

9. The content reproduction device of claim 1, wherein the controller is further configured to select the content based on a content selection input received from the first user.

10. The content reproduction device of claim 1, wherein the recommended content information is generated by the server based on at least one among user gender information, user age information, and user-preferred content information.

11. The content reproduction device of claim 8, wherein the first user identification information is obtained through image recognition of an image obtained by a camera provided in the content reproduction device.

12. The content reproduction device of claim 8, wherein the controller is further configured to detect the first user of a remote controller for controlling the content reproduction device, and to determine the first user identification information according to a result of a detection.

13. The content reproduction device of claim 1, wherein the recommended content information is generated by the server based on the viewing information transmitted to the server from the other content reproduction devices.

14. The content reproduction device of claim 13, wherein the recommended content information is generated based on viewer rating information, according to the viewing information.

15. The content reproduction device of claim 1, wherein the display is further configured to output an image received via a broadcast channel, and
the controller is further configured to reproduce the selected pieces of the content by using a virtual channel which is a channel different from the broadcast channel.

16. The content reproduction device of claim 1, wherein the recommended content information for selecting the content is generated by the server further based on a match between a biological feature of the first user that is included in the first user identification information and a same biological feature of the users that is included in the second user identification information.

17. A server for recommending content, the server comprising:
a controller that includes a microprocessor and is configured to receive viewing information about content reproduced in content reproduction devices, from the content reproduction devices, and generate recommended content information for selecting the content based on the received viewing information; and
a communicator, which includes a transceiver, and is configured for receiving a request for the recommended content information from a first content reproduction device of the content reproduction devices and transmitting the recommended content information to the first content reproduction device as a response to the request, wherein the controller is further configured to generate the recommended content information based on the viewing information related to a number of times the content is reproduced in second content reproduction devices, of the content reproduction devices, and further based on a first user identification information of a first user of the first content reproduction device and additionally based on a second user identification information of users of the second content reproduction devices, wherein at least one type of a biological feature of the first user that is included into the first user identification information is matched to a same biological feature of the users that is included in the second user identification information, wherein the second content reproduction devices are devices different from the first content reproduction device and the users of the second content reproduction devices are different from the first user of the first content reproduction device, and wherein the first content reproduction device is configured to output pieces of the content in succession one after another in an order from a highest number to a lowest number of times the content was reproduced in the second content reproduction devices, in response to a user input for turning on the first content reproduction device, the pieces of the content being selected based on the recommended content information.

18. The server of claim 17, wherein the recommended content information comprises information for selecting a broadcast channel.

19. The server of claim 17, wherein the recommended content information comprises connection information for accessing the content.

20. The server of claim 17, wherein the communicator is further configured for receiving the first user identification information from the first content reproduction device, and
the controller is further configured to generate the recommended content information corresponding to the first user identification information and a time at which the request is received.

21. The server of claim 17, wherein the recommended content information is generated by the controller further based on at least one among user gender information, user age information, and user-preferred content information.

22. The server of claim 17, wherein the controller is further configured to generate viewer rating information based on the viewing information received from the second content reproduction devices and to generate the recommended content information based on the viewer rating information.

23. The server of claim 17, wherein the controller is further configured to generate the recommended content information in cycles, and
the communicator is further configured for transmitting the recommended content information that is most recently generated from a time when the request is received, to the first content reproduction device.

24. A content reproduction method comprising:
receiving a user input via a user input receiver;
transmitting a request to a server for recommended content information, in response to the receiving the user input;
receiving the recommended content information as a response to the request, from the server;
selecting, by a microprocessor, content based on the received recommended content information; and
outputting the content by a first content reproduction device, wherein the recommended content information is information for selecting the content that is generated by the server according to viewing information related to a number of times the content is reproduced in second content reproduction devices, users of which are different from a first user of the first content reproduction device, and is generated by the server based on a first user identification information of the first user and additionally based on a second user identification information of the users, the selecting comprises selecting pieces of the content based on the recommended content information, and the outputting comprises outputting the selected pieces of the content in succession one after another in an order from a highest number to a lowest number of times the content was reproduced in the second content reproduction devices, on a screen of the first content reproduction device, in response to the user input for turning on the first content reproduction device that is received through the user input receiver.

25. The content reproduction method of claim 24, wherein the transmitting the request to the server for the recommended content information comprises:
requesting the server for the recommended content information in response to receiving an input indicating that a content reproduction mode of the first content reproduction device is set to a content recommendation mode.

26. The content reproduction method of claim 25, further comprising:
setting the content recommendation mode in response to a gesture input being detected as a gesture which has been defined and stored in advance as corresponding to setting the content reproduction mode to the content recommendation mode.

27. The content reproduction method of claim 25, further comprising:
setting the content recommendation mode in response to determining that a number of times content reproduced by the first content reproduction device is changed based on the user input for changing the content, is equal to or greater than a certain value.

28. The content reproduction method of claim 24, wherein the content is reproduced by using a broadcast signal received through a broadcast channel,
the recommended content information comprises information about the broadcast channel, and
the outputting the content further comprises tuning the broadcast channel based on the information about the broadcast channel.

29. The content reproduction method of claim 24, wherein the recommended content information comprises connection information for accessing the selected pieces of the content, and
the outputting the content further comprises receiving the selected pieces of the content by using the connection information and outputting the received selected pieces of content.

30. The content reproduction method of claim 24, wherein the transmitting the request to the server for the recommended content information comprises transmitting the first user identification information to the server.

31. The content reproduction method of claim 24, wherein the selecting the content further comprises selecting the content based on a content selection input received from the first user.

32. The content reproduction method of claim 24, wherein the recommended content information is generated by the server further based on at least one among user gender information, user age information, and user-preferred content information.

33. The content reproduction method of claim 30, wherein the first user identification information is obtained through image recognition of an image obtained by a camera provided in the first content reproduction device.

34. The content reproduction method of claim 24, wherein the recommended content information is generated by the server based on the viewing information transmitted to the server from the second content reproduction devices.

35. The content reproduction method of claim 34, wherein the recommended content information is generated based on viewer rating information according to the viewing information.

36. The content reproduction method of claim 24, wherein the outputting the selected pieces of the content further comprises:
   outputting an image received via a broadcast channel, and
   outputting the selected pieces of the content by using a virtual channel which is a channel different from the broadcast channel.

37. A method performed by a server, the method comprising:
   receiving, by the server, viewing information about content reproduced in content reproduction devices, from the content reproduction devices;
   generating, by the server, recommended content information for selecting the content, based on the received viewing information;
   receiving, by the server, a request for the recommended content information from a first content reproduction device of the content reproduction devices; and
   transmitting, the server, the recommended content information to the first content reproduction device as a response to the request,
   wherein the generating the recommended content information comprises generating the recommended content information based on a viewing information related to a number of times the content is reproduced in second content reproduction devices, of the content reproduction devices, and further based on a first user identification information of a first user of the first content reproduction device and additionally based on a second user identification information of users of the second content reproduction devices,
   wherein at least one type of a biological feature of the first user that is included into the first user identification information is matched to a same biological feature of the users that is included in the second user identification information,
   wherein the second content reproduction devices are devices different from the first content reproduction device and the users of the second content reproduction devices are different from the first user of the first content reproduction device, and
   wherein pieces of the content are output in the first content reproduction device, in succession one after another in an order from a highest number to a lowest number of times the content was reproduced in the second content reproduction devices, in response to a user input for turning on the first content reproduction device, the pieces of the content being selected based on the recommended content information.

38. The method of claim 37, wherein the recommended content information comprises information for selecting a broadcast channel.

39. The method of claim 37, wherein the recommended content information comprises connection information for accessing the selected pieces of the content.

40. The method of claim 37, wherein the receiving the request for the recommended content information comprises receiving the first user identification information from the first content reproduction device, and
   the transmitting the recommended content information comprises transmitting to the first content reproduction device the recommended content information corresponding to the first user identification information and a time when the request is received.

41. The method of claim 37, wherein the recommended content information is generated by the server further based on at least one among user gender information, user age information, and user-preferred content information.

42. The method of claim 37, wherein the generating the recommended content information further comprises:
   generating a viewer rating information about the content based on the viewing information received from the second content reproduction devices; and
   generating the recommended content information based on the viewer rating information.

43. The method of claim 37, wherein the generating the recommended content information further comprises generating the recommended content information in cycles, and
   the transmitting the recommended content information comprises transmitting to the first content reproduction device the recommended content information that is mostly recently generated, from a time at which the request is received.

44. A non-transitory computer-readable recording medium having embodied thereon a program for executing the content reproduction method of claim 24.

45. A non-transitory computer-readable recording medium having embodied thereon a program for executing the method of claim 37.

46. A content reproduction apparatus comprising:
   a content reproduction device; and
   a microprocessor which is configured to recommend content appropriate for a user of the content reproduction device by:
     determining a frequency rate with which content pieces are viewed by users of other devices, the users of the other devices being different from the user of the content reproduction device;
     obtaining a first user information of the user of the content reproduction device;
     generating a first user profile based on the first user information;
     rating the content pieces based on the frequency rate, based on a first user identification information included in the first user profile and additionally based on a second user identification information included in second user profiles of the users of the other devices; and
     recommending the content pieces based on the rating, by displaying the rated content pieces in succession one after another in an order from a highest number to a lowest number of times the content was reproduced in the other devices, on the content reproduction device.

47. The content reproduction apparatus claim 46, wherein the generating the first user profile comprises:

generating the first user profile further based on at least one among a user gender, a user age information, and a user-preferred content genre.

48. The content reproduction apparatus claim 46, wherein the microprocessor is further configured to control the displaying the content pieces in succession based on the rating, in response to receiving an input signal, and the content pieces are displayed together with at least one among a short description of a respective content piece, a metadata related to the respective content piece, and a criterion for recommending the respective content piece.

\* \* \* \* \*